US009921784B2

(12) United States Patent
Ichikawa et al.

(10) Patent No.: US 9,921,784 B2
(45) Date of Patent: Mar. 20, 2018

(54) INFORMATION PROCESSING PROGRAM PRODUCT, INFORMATION PROCESSING APPARATUS, AND INFORMATION PROCESSING SYSTEM

(71) Applicants: Mikiya Ichikawa, Kanagawa (JP); Tomoaki Okamura, Tokyo (JP); Akio Ishida, Tokyo (JP)

(72) Inventors: Mikiya Ichikawa, Kanagawa (JP); Tomoaki Okamura, Tokyo (JP); Akio Ishida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/308,701

(22) PCT Filed: Jun. 19, 2015

(86) PCT No.: PCT/JP2015/068437
§ 371 (c)(1),
(2) Date: Nov. 3, 2016

(87) PCT Pub. No.: WO2015/194682
PCT Pub. Date: Dec. 23, 2015

(65) Prior Publication Data

US 2017/0192723 A1 Jul. 6, 2017

(30) Foreign Application Priority Data

Jun. 20, 2014 (JP) ................................ 2014-127096
May 12, 2015 (JP) ................................ 2015-097118

(51) Int. Cl.
*G06F 3/12* (2006.01)
*G06K 7/10* (2006.01)
(Continued)

(52) U.S. Cl.
CPC ............ *G06F 3/1203* (2013.01); *G06F 21/42* (2013.01); *G06F 21/608* (2013.01); *G06F 21/62* (2013.01);
(Continued)

(58) Field of Classification Search
USPC ........................................................ 358/1.14
See application file for complete search history.

(56) References Cited

U.S. PATENT DOCUMENTS 8,159,684 B2 4/2012 Ichikawa
8,159,708 B2 4/2012 Ichikawa
(Continued)

FOREIGN PATENT DOCUMENTS

EP 2367134 A1 9/2011
EP 2725481 A2 4/2014
(Continued)

OTHER PUBLICATIONS

International Search Report dated Aug. 11, 2015 in PCT/JP2015/068437 filed on Jun. 19, 2015.
(Continued)

*Primary Examiner* — Ngon Nguyen
(74) *Attorney, Agent, or Firm* — Cooper & Dunham LLP

(57) ABSTRACT

An information processing apparatus is connected to one or more apparatuses via a network and includes a first acquisition unit that acquires communication information for communicating with any of the one or more apparatuses and authority information for writing the communication information to a predetermined information medium, a determination unit that determines whether the writing the communication information to the information medium is permitted based on the acquired authority information, and an updating unit that writes the communication information to the information medium when it is determined that the writing
(Continued)

the communication information is permitted, to update the information medium with the written communication information.

14 Claims, 18 Drawing Sheets

(51) Int. Cl.

| | |
|---|---|
| ***G06F 21/42*** | (2013.01) |
| ***G06K 15/02*** | (2006.01) |
| ***G06F 21/60*** | (2013.01) |
| ***H04W 4/00*** | (2018.01) |
| ***H04W 12/02*** | (2009.01) |
| ***H04W 12/08*** | (2009.01) |
| ***G06F 21/62*** | (2013.01) |

(52) U.S. Cl.

CPC ............... *G06K 7/10* (2013.01); *G06K 15/02* (2013.01); *H04W 4/008* (2013.01); *H04W 12/02* (2013.01); *H04W 12/08* (2013.01); *G06F 3/12* (2013.01)

(56) References Cited

U.S. PATENT DOCUMENTS

| | | | |
|---|---|---|---|
| 8,565,631 B2 | 10/2013 | Ichikawa et al. | |
| 8,643,853 B2 | 2/2014 | Ichikawa | |
| 8,970,888 B2 | 3/2015 | Ichikawa | |
| 9,036,178 B2 | 5/2015 | Norota | |
| 2007/0019232 A1 | 1/2007 | Kano | |
| 2011/0231922 A1 | 9/2011 | Azuma | |
| 2013/0250358 A1* | 9/2013 | Suzuki | H04L 65/1069 358/1.15 |
| 2013/0258381 A1 | 10/2013 | Sato | |
| 2014/0118769 A1 | 5/2014 | Adachi et al. | |
| 2014/0185082 A1 | 7/2014 | Yamada | |
| 2015/0212769 A1 | 7/2015 | Norota et al. | |
| 2015/0331649 A1* | 11/2015 | Kadota | G06F 3/1292 358/1.13 |

FOREIGN PATENT DOCUMENTS

| | | |
|---|---|---|
| JP | 2003-143184 | 5/2003 |
| JP | 2006-211039 | 8/2006 |
| JP | 2007-034443 | 2/2007 |
| JP | 2008-146202 | 6/2008 |
| JP | 2013-196511 | 9/2013 |
| JP | 2013-214806 | 10/2013 |
| JP | 2014-032518 | 2/2014 |
| JP | 2014-032661 | 2/2014 |
| JP | 2015-159533 | 9/2015 |

OTHER PUBLICATIONS

European search report dated May 10, 2017 in connection with corresponding European patent application No. 15810328.3.

* cited by examiner

| USER ID | PASSWORD | AUTHORITY INFO. |
| --- | --- | --- |
| user001 | xxxabc | ADMINISTRATOR |
| user002 | yyyabc | GENERAL |
| user003 | zzzabc | GENERAL |
| ... | | |

| SSID | ENCRYPTION | IP ADDRESS | ... |
| --- | --- | --- | --- |
| 123abc | WPA/WPA2-PSK | 192.168.0.1 | ... |

| AUTHORITY INFO. | SSID | ENCRYPTION | IP ADDRESS | ... |
|---|---|---|---|---|
| ADMINISTRATOR | 123abc | WPA/WPA2-PSK | 192.168.0.1 | ... |

| PDL | DUPLEX | MONOCHRO. | COLOR | STAPLE | ・・・ |
|---|---|---|---|---|---|
| ○○PDL | YES | YES | NO | NO | ・・・ |

| SSID | ENCRYPTION | IP ADDRESS | … | PDL | DUPLEX | MONOCHRO. | COLOR | STAPLE | … |
|---|---|---|---|---|---|---|---|---|---|
| 123abc | WPA/WPA2-PSK | 192.168.0.1 | … | OOPDL | YES | YES | NO | NO | … |

4100 4200 4300

USER ID: user001

CONTENTS OF DATA WRITTEN
TO NFC TAG

SSID: 123abc
ENCRYPTION: WPA/WPA2-PSK
IP ADDRESS: 192.168.0.1
PDL: ○○PDL
DUPLEX: YES
MONOCHRO.: YES
COLOR: NO
STAPLE: NO

UPDATE 5001A

5000A

INFORMATION PROCESSING PROGRAM PRODUCT, INFORMATION PROCESSING APPARATUS, AND INFORMATION PROCESSING SYSTEM

TECHNICAL FIELD

The present invention relates to an information processing program product, an information processing apparatus, and an information processing system.

BACKGROUND ART

Conventionally, a method of writing data from a mobile terminal to an NFC (near field communication) chip attached to an external device, is known in the related art. For example, see Japanese Laid-Open Patent Publication No. 2006-211039.

Also known in the related art is a method of acquiring communication information, such as an IP (internet protocol) address, from an NFC chip when a user carrying a mobile terminal desires to use one of functions of an image forming apparatus, such as a printing function or a scanner function, the communication information being needed for the mobile terminal to communicate with the image forming apparatus.

Hence, by utilizing the method disclosed in Japanese Laid-Open Patent Publication No. 2006-211039, communication information needed for the mobile terminal to communicate with the image forming apparatus may be written to the NFC chip. In the following, the NFC chip will also be called an information medium.

SUMMARY OF THE INVENTION

Problem to be Solved by the Invention

However, the above-described methods have a problem that even a user having no authority like an administrator can write data to the NFC chip with ease. Hence, there is a possibility that undesired information is written to the NFC chip by a third party, and it is difficult for the above-described methods to provide adequate security of information.

Means for Solving the Problem

In one aspect, the present invention provides an information processing program product, an information processing apparatus, and an information processing system which are capable of safely preventing an information medium such as an NFC chip from being updated with undesired information including no proper authority information.

In one embodiment, the present invention provides an information processing program product including: a non-transitory computer-readable medium having a program recorded thereon that is executable by a processor of an information processing apparatus connected to one or more apparatuses via a network, the program when executed causing the processor to implement functions of a first acquisition unit configured to acquire communication information for communicating with an apparatus among the one or more apparatuses and authority information for writing the communication information to a predetermined information medium; a determination unit configured to determine whether the writing the communication information to the information medium is permitted based on the authority information acquired by the first acquisition unit; and an updating unit configured to write the communication information to the information medium when it is determined that the writing the communication information is permitted, to update the information medium with the written communication information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 5 is a diagram showing an example of user information.

FIG. 6 is a diagram showing an example of communication information.

FIG. 8 is a diagram showing an image of a QR CODE® code.

FIG. 9 is a diagram showing an example of code information.

FIG. 14 is a diagram showing an example of function information.

FIG. 16 is a diagram showing an example of code information according to the second embodiment.

DETAILED DESCRIPTION OF THE PREFERRED EMBODIMENTS

A description will be given of embodiments with reference to the accompanying drawings.

First Embodiment

Figure 1:
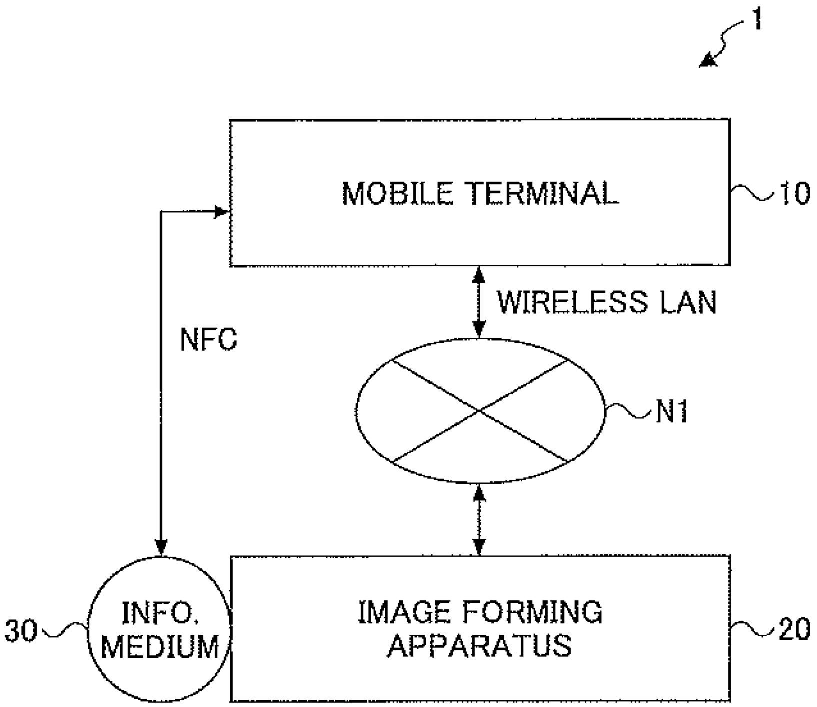
FIG. 1 is a diagram showing a configuration of a printing system according to a first embodiment.

A configuration of a printing system 1 according to a first embodiment is described. FIG. 1 is a diagram showing a configuration of the printing system 1 according to the first embodiment. The printing system 1 is an example of an information processing system according to the invention. As shown in FIG. 1, the printing system 1 may include a mobile terminal 10 and one or more image forming apparatuses 20, which are connected together via a network N1 by a cable or radio. Specifically, it is assumed that the mobile terminal 10 is connectable to the network N1 by radio. Moreover, it is assumed that an information medium 30 is attached to a housing (external surface) of the image forming apparatus 20, and the mobile terminal 10 and the information medium 30 can communicate with each other by near-field communication.

The mobile terminal 10 is an example of an information processing apparatus according to the invention, such as a smart phone, which is operated by a user. Examples of the mobile terminal 10 may include a mobile phone, a tablet terminal, a game machine, a PDA (personal digital assistant), a digital camera, etc. A printing application configured to forward a printing instruction of printing target data is installed in the mobile terminal 10. Hence, the mobile terminal 10 is capable of generating a print job including the printing target data associated with the printing instruction, and transmitting the print job to the image forming apparatus 20.

Moreover, the mobile terminal 10 includes an NFC (near field communication) device, such as an NFC chip, as described later. If a user holds the mobile terminal 10 close to the information medium 30 attached to the housing of the image forming apparatus 20 at a predetermined position, the user is able to perform updating (writing) or acquiring (reading) of information (communication information for communicating with the image forming apparatus 20) to or from the information medium 30. When the communication information stored in the information medium 30 is acquired, the mobile terminal 10 can transmit the print job to the image forming apparatus 20 based on the communication information, so that the print job may be performed on the image forming apparatus 20 to output a copy of the printing target data.

The printing application may be a software module, such as a browser, a document preparation program, or a viewer, which is configured to forward a printing instruction of printing target data to the image forming apparatus 20.

The image forming apparatus 20 may be an apparatus, such as a printer, which receive a print job from the mobile terminal 10 and outputs a copy of the printing target data. The image forming apparatus 20 may generate a QR CODE® (quick response) code based on its own communication information, and may display an image of the QR CODE® code on an operation panel. The mobile terminal 10 may acquire the communication information for updating the information medium 30 by reading the QR CODE® code, displayed on the operation panel of the image forming apparatus 20, using an imaging device, such as a camera.

The image forming apparatus 20 may be an MFP (multifunction peripheral) which has multiple functions, including a printing function, a copying function, a scanner function, a facsimile function, etc.

Moreover, the image forming apparatus 20 may be either an audio output device, such as a loudspeaker, or an output device, such as a projector, an electronic whiteboard, or a digital signage device. In the following, the printing system will be described as an example of the information processing system according to the invention. However, the present disclosure is not limited to the printing system. The information processing system according to the invention may be an audio output system in which a loudspeaker device is used instead of the image forming apparatus 20, or an image output system in which an image output device is used instead of the image forming apparatus 20. In other words, the present invention is applicable to any of various systems using a mobile terminal 10 to generate a predetermined job, and an apparatus to execute the predetermined job received from the mobile terminal 10.

The information medium 30 may include an NFC device, such as an NFC chip, attached to the housing of the image forming apparatus 20 at the predetermined position. In other words, the information medium 30 may be an NFC tag or the like. The communication information, such as an IP address, needed for the information medium 30 to communicate with the image forming apparatus 20 to which the information medium 30 is attached, is stored in the information medium 30. The mobile terminal 10 can perform updating (writing) or acquiring (reading) of the communication information to or from the information medium 30 by near-field communication. The information medium 30 may be an example of a predetermined information medium in the claims.

The above-described printing system 1 may include a printing server which accumulates a print job received from the mobile terminal 10. Moreover, the printing system 1 may include two or more mobile terminals 10.

Figure 2:
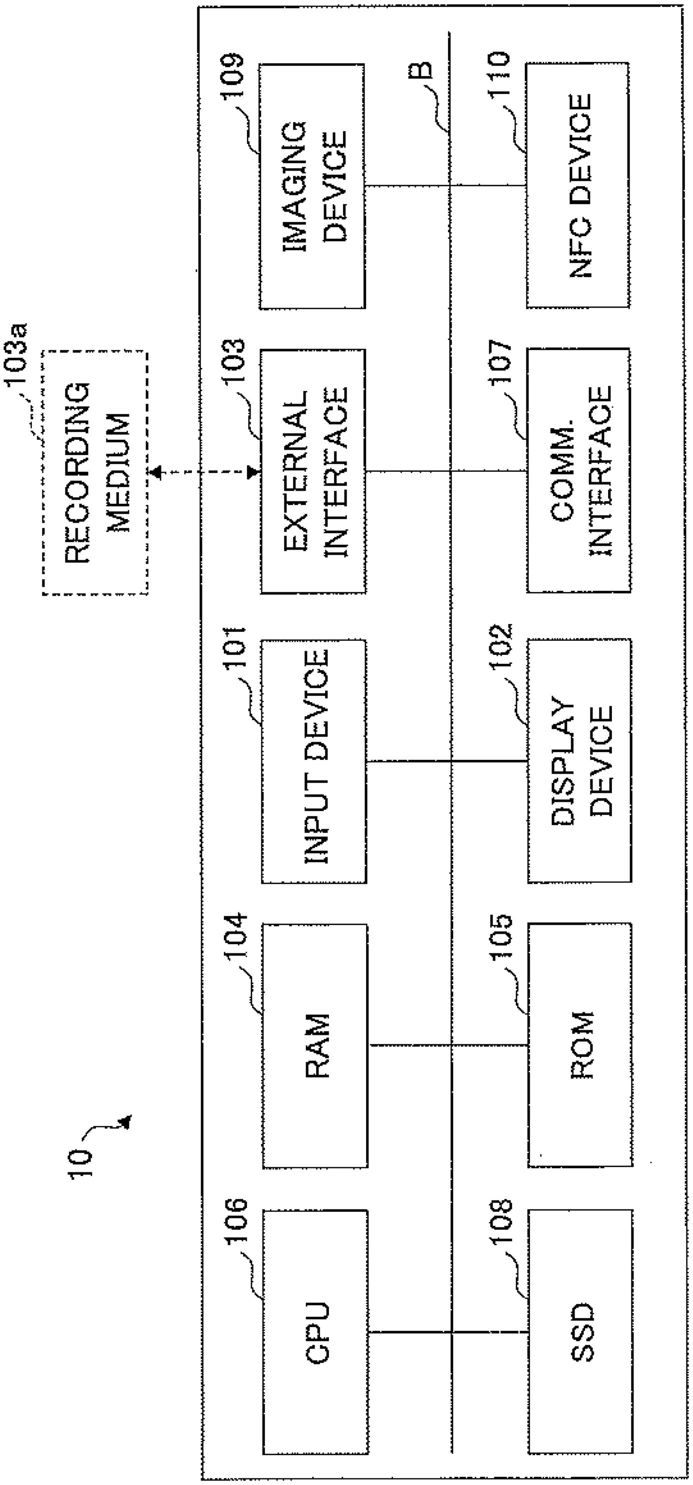
FIG. 2 is a block diagram showing a hardware configuration of a mobile terminal according to the first embodiment.

A mobile terminal 10 according to the first embodiment may be implemented by a hardware configuration as shown in FIG. 2. FIG. 2 is a diagram showing a hardware configuration of the mobile terminal 10 according to the first embodiment.

As shown in FIG. 2, the mobile terminal 10 may include an input device 101, a display device 102, an external interface 103, a RAM (random access memory) 104, a ROM (read-only memory) 105, a CPU (central processing unit) 106, a communication interface 107, an SSD (solid state drive) 108, an imaging device 109, and an NFC device 110, which are interconnected by a bus B.

The input device 101 may include a touch panel and the touch panel is used to input various signals to the mobile terminal 10. The input device 101 may include a keyboard, a mouse, etc. The display device 102 may include an LCD (liquid crystal display), and the LCD is used to display a processing result by the mobile terminal 10.

The external interface 103 may provide an interface for connecting the mobile terminal 10 with an external device. The external device may include a recording medium 103*a*. An information processing program used to implement the mobile terminal 10 according to the first embodiment may be stored in the recording medium 103*a*. The recording medium 103*a* is an example of an information processing program product according to the invention. The mobile terminal 10 is configured to read data from and write data to the recording medium 103*a* via the external interface 103.

The recording medium 103*a* may be any of various types of recording media, including an SD memory card, a USB (universal serial bus) memory, a DVD (digital versatile disk), a CD (compact disk), and a flexible disk.

The RAM 104 may be a volatile semiconductor memory (storage device) which temporarily stores programs and data. The ROM 105 may be a nonvolatile semiconductor memory (storage device) which can store programs and data even after power-down. The programs and data stored in the ROM 105 may include a BIOS (basic input/output system) which is executed upon a startup of the mobile terminal 10, the OS setting, the network setting, etc.

The CPU 106 may be a processor which controls the entire mobile terminal 10 and implements the functions of the mobile terminal 10 by reading out the programs and data from the memory, such as the ROM 105 or the SSD 108, to the RAM 104 and executing the programs to perform the relevant processes.

The communication interface 107 may provide an interface which connects the mobile terminal 10 with a mobile phone network, the Internet, etc. Hence, the mobile terminal 10 is capable of performing data communication by using the communication interface 107.

The SSD 108 may be a nonvolatile memory which stores programs and data. The programs and data stored in the SSD 108 may include an OS (operating system) as system software to control the entire mobile terminal 10, and application programs which are executed on the OS to provide various functions of the mobile terminal 10. In the SSD 108, the programs and data stored therein are managed by using a predetermined file system and/or databases. In addition, the mobile terminal 10 may include an HDD (hard disk drive) instead of the SSD 108 or in addition to the SSD 108.

The imaging device 109 may be a camera. Hence, the mobile terminal 10 is capable of reading a QR CODE® code which is displayed on the operation panel of the image forming apparatus 20, by using the imaging device 109.

The NFC device 110 may be an NFC chip. Hence, the mobile terminal 10 is capable of performing data communication by using the NFC device 110.

By using the above-described hardware configuration, the mobile terminal 10 according to the first embodiment is capable of performing various processes which will be described later.

Figure 3:
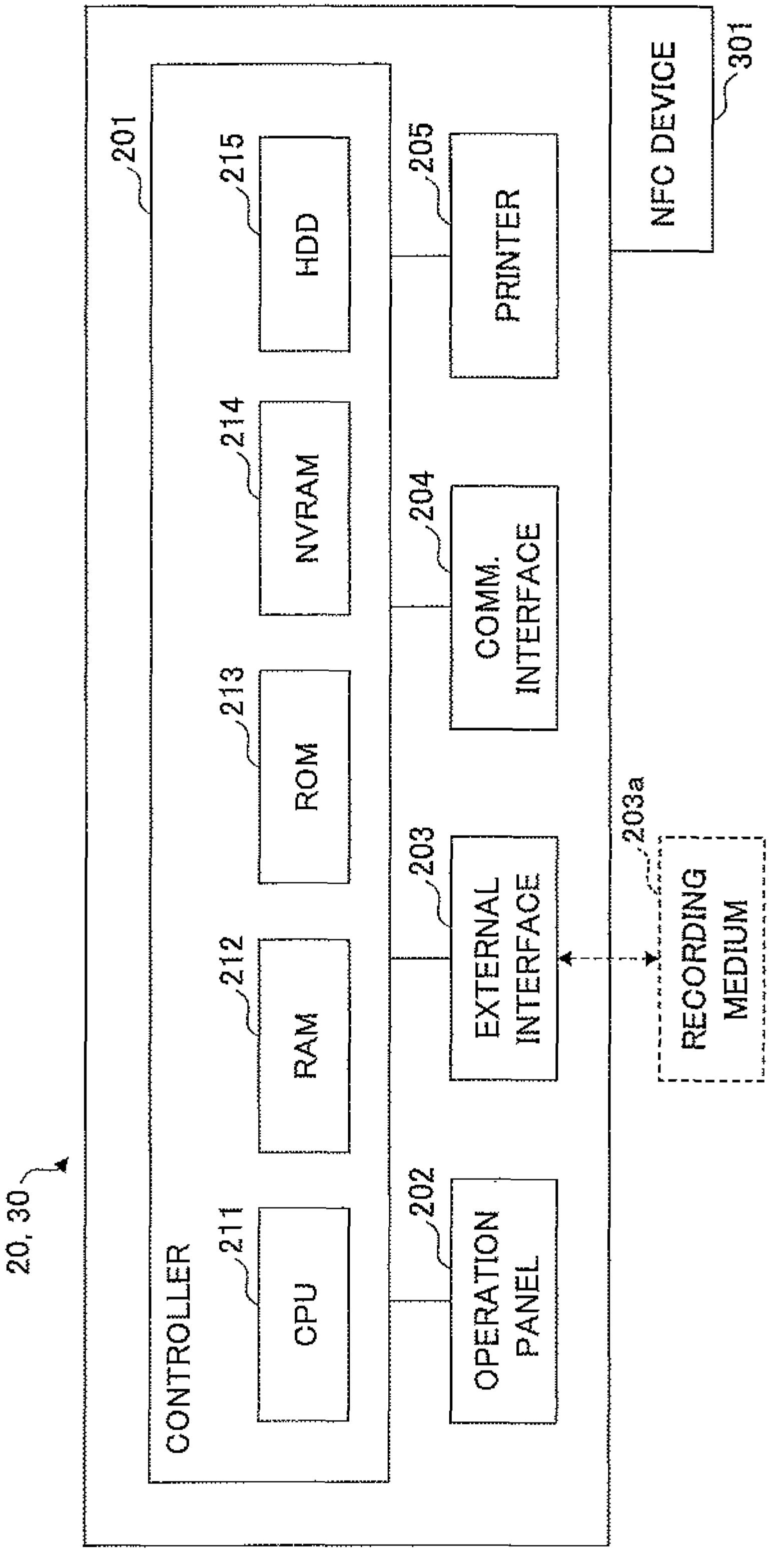
FIG. 3 is a block diagram showing a hardware configuration of an image forming apparatus and an information medium according to the first embodiment.

An image forming apparatus 20 and an information medium 30 according to the first embodiment may be implemented by a hardware configuration as shown in FIG. 3. FIG. 3 is a diagram showing a hardware configuration of the image forming apparatus 20 and the information medium 30 according to the first embodiment.

As shown in FIG. 3, the image forming apparatus 20 may include a controller 201, an operation panel 202, an external interface 203, a communication interface 204, and a printer 205. Moreover, an NFC (near field communication) device 301 may be attached to an external surface (housing) of the image forming apparatus 20 as a component which implements the information medium 30.

The controller 201 includes a CPU 211, a RAM 212, a ROM 213, an NVRAM 214, and a HDD 215. The ROM 213 stores various programs and data. The RAM 212 temporarily stores programs and data. The NVRAM 214 stores setting information and others. The HDD 215 stores programs and data.

The CPU 211 may be a processor which controls the entire image forming apparatus 20 and implements the functions of the image forming apparatus 20 by reading out programs, data, and setting information from the memory, such as the ROM 213, the NVRAM 214 or the HDD 215, to the RAM 212 and executing the programs to perform the relevant processes.

The operation panel 202 may include an input unit to receive inputs from a user, and a display unit to display information, such as results of processes performed by the CPU 211. The external interface 203 may provide an interface for connecting the image forming apparatus 20 with an external device. The external device may be a recording medium 203*a* or the like. Hence, the image forming apparatus 20 is capable of reading data from and/or writing data to the recording medium 203*a* through the external interface 203. Examples of the recording medium 203*a* may include a flexible disk, a CD, a DVD, an SD memory card, a USB memory, etc.

The communication interface 204 may provide an interface for connecting the image forming apparatus 20 with the network N1. Hence, the image forming apparatus 20 is capable of performing data communication through the communication interface 204. The printer 205 may be a printer for printing and outputting a copy of printing target data.

The NFC device 301 may be an NFC chip or the like. The information medium 30 is capable of performing data communication with the mobile terminal 10 through the NFC device 301. For example, the NFC device 301 is an NFC chip attached to an external surface (housing) of the image forming apparatus 20 at a predetermined position. In this case, it is preferred that the NFC chip is attached to a position where near field communication between the image forming apparatus and the mobile terminal 10 can be easily performed.

Alternatively, the NFC device 301 may be provided inside the image forming apparatus 20 at a position where near field communication between the NFC device 301 and the NFC device 110 (the mobile terminal 10) is executable, instead of being provided on the external surface of the image forming apparatus 20.

By using the above-described hardware configuration, the image forming apparatus 20 and the information medium 30 according to the first embodiment perform various processes which will be described later.

Figure 4:
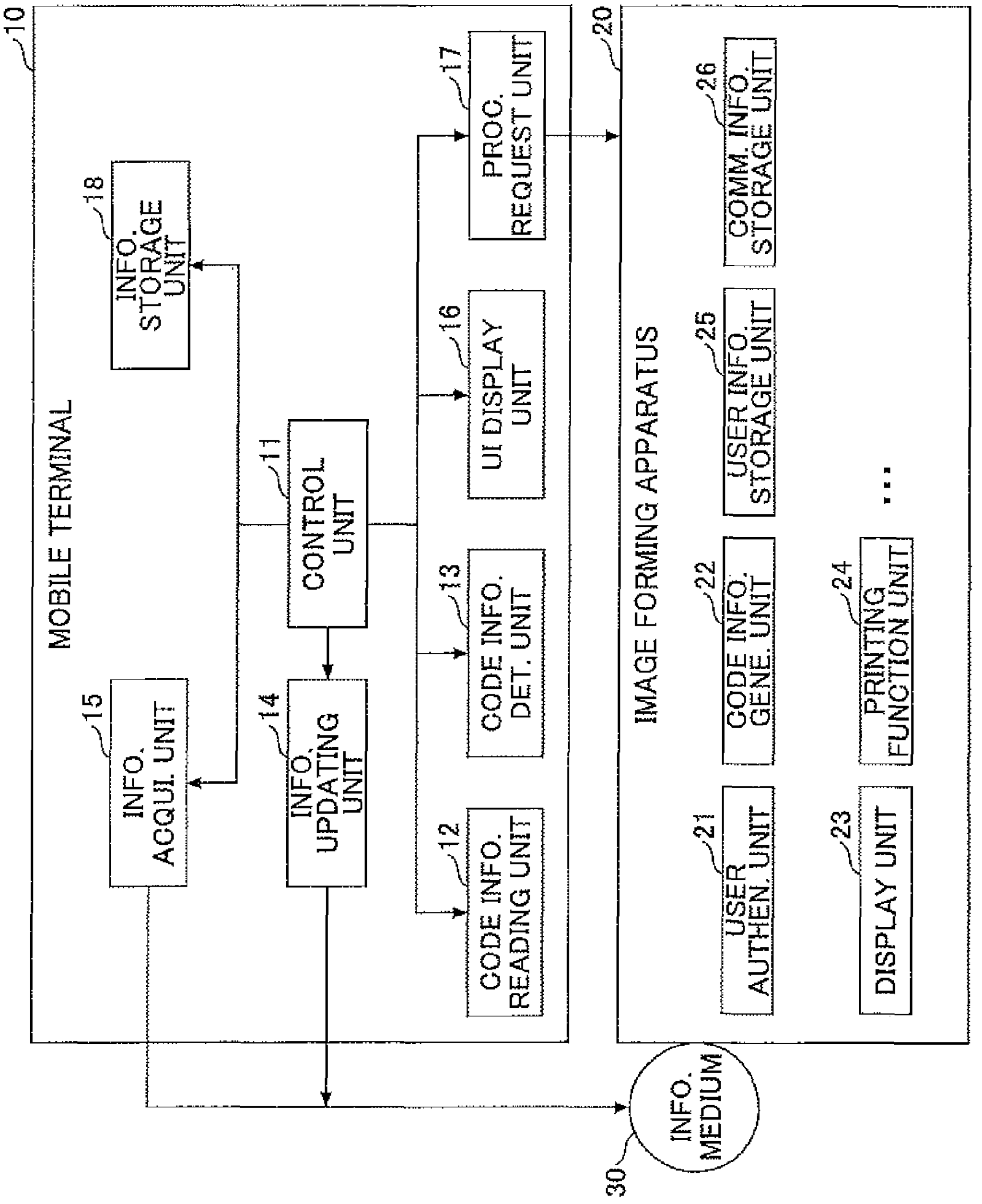
FIG. 4 is a block diagram showing a functional configuration of the printing system according to the first embodiment.

The printing system 1 according to the first embodiment may be implemented by a functional configuration as shown in FIG. 4. FIG. 4 is a block diagram showing a functional configuration of the printing system 1 according to the first embodiment.

As shown in FIG. 4, the mobile terminal 10 of the printing system 1 may include a control unit 11, a code information reading unit 12, a code information determining unit 13, an information updating unit 14, an information acquisition unit 15, a UI display unit 16, a processing request unit 17, and an information storage unit 18.

Moreover, the image forming apparatus 20 of the printing system 1 may include a user authentication unit 21, a code information generation unit 22, a display unit 23, a printing function unit 24, a user information storage unit 25, and a communication information storage unit 26.

The control unit 11 of the mobile terminal 10 may be implemented by the CPU 106, and is configured to send a processing request to a target unit of the mobile terminal 10 in response to an input operation received from a user through the input device 101 or a request received from any of other units of the mobile terminal 10.

The code information reading unit 12 of the mobile terminal 10 may be implemented by the CPU 106 and the imaging device 109, and is configured to read a code, such as a QR CODE® code, and acquire information included in the code (which information will be called "code information"). As described later, the code information may include communication information for communicating with the image forming apparatus 20, and authority information indicating whether to permit the writing of the communication information to the information medium 30.

The code information determining unit 13 of the mobile terminal 10 may be implemented by the CPU 106 and is configured to determine whether the writing the communication information included in the code information to the information medium 30 is permitted based on the authority information included in the code information.

The information updating unit 14 of the mobile terminal 10 may be implemented by the CPU 106 and the NFC device 110 and is configured to write the information (communication information) stored in the information storage unit 18 to the information medium 30 to update the information stored in the information medium 30.

The information acquisition unit 15 of the mobile terminal 10 may be implemented by the CPU 106 and the NFC device 110 and is configured to acquire the information (communication information) stored in the information medium 30.

The UI display unit 16 of the mobile terminal 10 may be implemented by the CPU 106 and the display device 102 and is configured to generate and display a UI (user interface) screen.

The processing request unit 17 of the mobile terminal 10 may be implemented by the CPU 106 and is configured to transmit a print job execution request to the image forming apparatus 20.

The information storage unit 18 of the mobile terminal 10 may be implemented by the ROM 105 or, the SSD 108 and is configured to store the communication information included in the code information acquired by the code information reading unit 12.

The user authentication unit 21 of the image forming apparatus 20 may be implemented by the CPU 211 and is configured to authenticate a user who has performed a log-in operation to the image forming apparatus 20, based on user information stored in the user information storage unit 25.

The code information generation unit 22 of the image forming apparatus 20 may be implemented by the CPU 211 and is configured to generate a predetermined code based on the communication information stored in the communication information storage unit 26 and the user information stored in the user information storage unit 25. The predetermined code generated by the code information generation unit 22 may be a QR CODE® code. However, the predetermined code is not limited to a QR CODE® code. The predetermined code generated by the code information generation unit 22 may be any of a one-dimensional code, such as a bar code, and a two-dimensional code, such as an SP code or a CP code. In the following, the code information generation unit 22 configured to generate a QR CODE® code will be described as an example of the code information generation unit 22.

The display unit 23 of the image forming apparatus 20 may be implemented by the operation panel 202 and is configured to generate and display a UI screen. Moreover, the display unit 23 is configured to display an image of a QR CODE® code generated by the code information generation unit 22.

The printing function unit 24 of the image forming apparatus 20 may be implemented by the printer 205 and is configured to output a copy of printing target data included in a print job whose execution is requested from the processing request unit 17 of the mobile terminal 10. The image forming apparatus 20 may further include, in addition to the printing function unit 24, a scanner function unit for generating image data (electronic data) from a read document, a copying function unit for outputting a copy of a read document, and a facsimile function unit for performing facsimile transmission of image data or electronic data of a read document through a public telephone line.

The user information storage unit 25 of the image forming apparatus 20 may be implemented by the HDD 215 and is configured to store user information 1000 which is used for generation of a QR CODE® code or for authentication of a user. The details of the user information 1000 will be described later.

The communication information storage unit 26 of the image forming apparatus 20 may be implemented by the HDD 215 and is configured to store communication information 2000 including information needed for the mobile terminal 10 to communicate with the image forming apparatus 20. The details of the communication information 2000 will be described later.

The information medium 30 may be implemented by the NFC device 301 and is configured to store the communication information, such as an IP address of the image forming apparatus 20 to which the information medium 30 is attached.

Here, the user information 1000 stored in the user information storage unit 25 of the image forming apparatus 20 is described with reference to FIG. 5. FIG. 5 is a diagram showing an example of the user information 1000.

The user information 1000 includes items of information related to a user who can log in to the image forming apparatus 20. As shown in FIG. 5, the user information 100 includes items of USER ID, PASSWORD, and AUTHORITY INFORMATION. The USER ID item is identification information that uniquely identifies a user who can log in to the image forming apparatus 20. The PASSWORD item is an authentication password for logging in to the image forming apparatus 20 with the associated user ID.

The AUTHORITY INFORMATION item is information related to the authority given to the user with the associated user ID. For example, a user ID whose authority information is "administrator" is a user ID used by an administrator of the printing system 1 and only this user is permitted to update (write) the communication information of the information medium 30 (NFC chip). On the other hand, a user ID whose authority information is "general" is a user ID used by a general user of the printing system 1, and this user is not permitted to update (write) the communication information of the information medium 30 (NFC chip). In other words, a user having a user ID whose authority information is "general" is permitted to only acquire (read) the communication information from the information medium 30.

Next, the communication information 2000 stored in the communication information storage unit 26 of the image forming apparatus 20 is described with reference to FIG. 6. FIG. 6 is a diagram showing an example of the communication information 2000.

The communication information 2000 includes several items of information needed for the mobile terminal 10 to communicate with the image forming apparatus 20. As shown in FIG. 6, the communication information 2000 includes items of SSID (service set identifier), ENCRYPTION, IP ADDRESS, etc.

The SSID item is identification information that identifies the network N1 to which the mobile terminal 10 is connected to communicate with the image forming apparatus 20. In the communication information 2000 shown in FIG. 6, "123abc" is set up as the SSID item.

The ENCRYPTION item is a type of encryption used for data communication in the network N1 to which the mobile terminal 10 is connected. In the communication information 2000 shown in FIG. 6, "WPA/WPA2-PSK" is set up as the type of encryption used for data communication in the network N1. The IP ADDRESS item is address information indicating a location of the image forming apparatus 20 in the network N1. In the communication information 2000 shown in FIG. 6, "192.168.0.1" is set up as the IP address of the image forming apparatus 20.

In addition to the above items of information, the communication information 2000 may further include an HTTP (hypertext transfer protocol) port number or an HTTPS (HTTP over SSL/TLS) port number of the image forming apparatus 20, which is needed when the mobile terminal 10 communicates with the image forming apparatus 20, and a password which is needed for connecting the mobile terminal 10 to the network N1.

Next, processes performed by the printing system 1 according to the first embodiment will be described.

A QR CODE® code display process which is performed by the printing system 1 to display an image of a QR CODE® code on the operation panel 202 of the image forming apparatus 20 will be described. In an information medium update process which will be described later, the mobile terminal 10 is capable of reading a displayed image of a QR CODE® code to acquire the communication information of the image forming apparatus 20 to be written to the information medium 30 of the update object.

Figure 7:
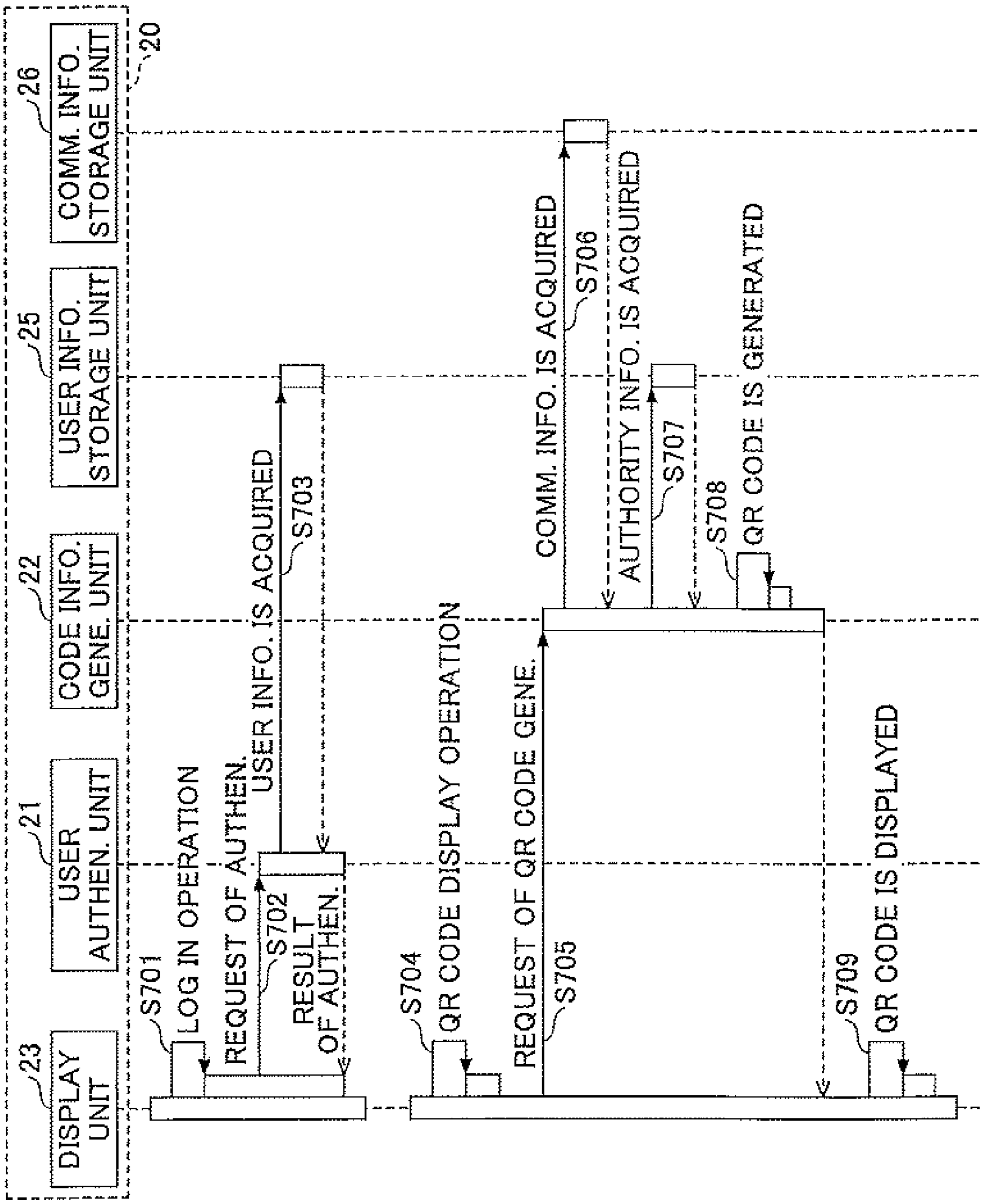
FIG. 7 is a sequence diagram for explaining a QR CODE® code display process performed by the printing system according to the first embodiment.

FIG. 7 is a sequence diagram for explaining the QR CODE® code display process performed by the printing system 1 according to the first embodiment.

As shown in FIG. 7, in step S701, a user performs a predetermined log-in operation through the operation panel 202 of the image forming apparatus 20. At this time, the user enters a user ID and a password for logging in to the image forming apparatus 20 through the operation panel 202. In the following description, it is assumed that the user has entered the user ID "user001" and the password "xxxabc" (namely, the authority information of this user is "administrator") through the log-in operation.

In step S702, the display unit 23 of the image forming apparatus 20 transmits an authentication request, including the user ID and the password, to the user authentication unit 21.

In step S703, the user authentication unit 21 of the image forming apparatus 20 acquires the user information 1000 from the user information storage unit 25, and performs authentication of the user ID and the password included in the authentication request. Namely, the user authentication unit 21 determines whether a pair of the user ID and the password included in the authentication request is included in the user information 1000. When the pair of the user ID and the password included in the authentication request is included in the user information 1000, the user authentication unit 21 transmits an authentication result indicating that the authentication has been successfully performed to the display unit 23. On the other hand, when the pair of the user ID and the password included in the authentication request is not included in the user information 1000, an authentication result indicating that the authentication has failed is transmitted to the display unit 23.

Because the pair of the user ID "user001" and the password "xxxabc" included in the authentication request according to the above assumption is included in the user information 1000, the user authentication unit 21 transmits an authentication result indicating that the authentication has been successfully performed to the display unit 23. Hence, in this case, the user's login operation is completed successfully. On the other hand, when an authentication result indicating that the authentication has failed is received from the user authentication unit 21, the display unit 23 may display information indicating that the authentication has failed on the operation panel 202.

In step S704, by using the operation panel 202 of the image forming apparatus 20, the user performs a predetermined operation for displaying a QR CODE® code image.

In step S705, the display unit 23 of the image forming apparatus 20 transmits a QR CODE® code generation request to the code information generation unit 22.

After the QR CODE® code generation request is received from the display unit 23, in step S706, the code information generation unit 22 of the image forming apparatus 20 acquires the communication information 2000 from the communication information storage unit 26.

In step S707, the code information generation unit 22 of the image forming apparatus 20 acquires the log-in user's authority information included in the user information 1000 from the user information storage unit 25. In this example, the authority information "administrator" of the user ID "user001" is acquired.

In step S708, the code information generation unit 22 of the image forming apparatus 20 generates a QR CODE® code as shown in FIG. 8, based on the communication information 2000 acquired at step S706 and the log-in user's authority information of the user information 1000 acquired at step S707.

Here, the QR CODE® code generated by the code information generation unit 22 may include code information 4000 as shown in FIG. 9. In other words, the code information 4000 as shown in FIG. 9 may be acquired by the mobile terminal 10 when the mobile terminal 10 reads the QR CODE® code generated at the step S708, in an "information medium update process" which will be described later.

FIG. 9 is a diagram showing an example of the code information 4000. As shown in FIG. 9, the code information 4000 includes authority information 4100 and communication information 4200. Here, the authority information 4100 is consistent with the log-in user's authority information included in the user information 1000 and acquired from the user information storage unit 25 at the step S707. The communication information 4200 is consistent with the communication information 2000 acquired from the communication information storage unit 26 at the step S706.

In step S709, the display unit 23 of the image forming apparatus 20 displays an image of the QR CODE® code generated by the code information generation unit 22 on the operation panel 202.

For example, the image forming apparatus 20 may be configured so that the QR CODE® code image displayed on the operation panel automatically disappears after a predetermined time period has elapsed. Or, the image forming apparatus 20 may be configured so that the QR CODE® code image displayed on the operation panel will disappear when a sensor (not illustrated) of the image forming apparatus 20 detects that the user has left the image forming apparatus 20, or when the operating mode of the image forming apparatus 20 is shifted to a power saving mode. In such a case, it is possible to prevent the QR CODE® code image from being superfluously displayed on the operation panel 202 of the image forming apparatus 20.

By the above-described QR CODE® code display process, the image of the QR CODE® code for updating the communication information stored in the information medium 30 is displayed on the operation panel 202 of the image forming apparatus 20.

Next, an information medium update process performed by the printing system 1 according to the first embodiment will be described. In this information medium update process, the QR CODE® code image displayed on the operation panel 202 of the image forming apparatus 20 is read by the mobile terminal 10, and the communication information stored in the information medium 30 is updated based on the QR CODE® code.

Figure 10:
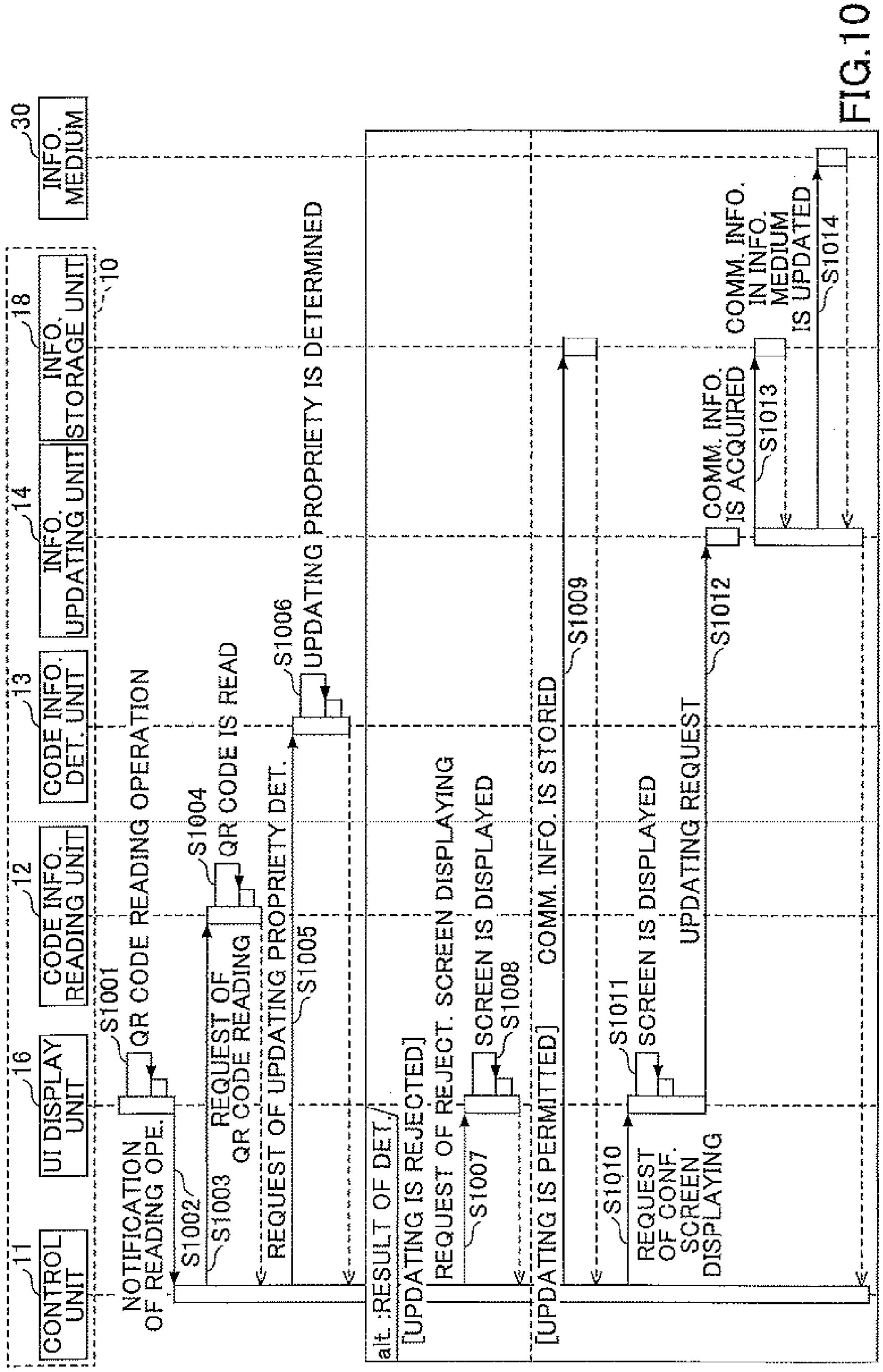
FIG. 10 is a sequence diagram for explaining an information medium update process performed by the printing system according to the first embodiment.

FIG. 10 is a sequence diagram for explaining an information medium update process performed by the printing system 1 according to the first embodiment.

As shown in FIG. 10, in step S1001, the user performs a QR CODE® code reading operation through the input device 101 of the mobile terminal 10. For example, the user starts operation of the imaging device 109 of the mobile terminal 10 by using a predetermined application selected from the UI display unit 16, so that the mobile terminal 10 is set in a QR CODE® code readable state. Then, the QR CODE® code can be read by causing the imaging device 109 of the mobile terminal 10 to capture the QR CODE® code image displayed on the operation panel 202 of the image forming apparatus 20.

In step S1002, the UI display unit 16 of the mobile terminal 10 sends a notification that the QR CODE® code reading operation has been performed to the control unit 11.

In step S1003, the control unit 11 of the mobile terminal 10 transmits a QR CODE® code reading request to the code information reading unit 12.

After the QR CODE® code reading request is received, in step S1004, the code information reading unit 12 of the mobile terminal 10 reads the QR CODE® code image displayed on the operation panel 202 of the image forming apparatus 20, and acquires the code information 4000 included in the read QR CODE® code. Then, the code information reading unit 12 sends a notification that the reading of the QR CODE® code has been completed to the control unit 11.

After the notification that the reading of the QR CODE® code has been completed is received, in step S1005, the control unit 11 transmits to the code information determining unit 13 a request of determination as to whether the updating of the information medium 30 by the communication information 4200 included in the acquired code information 4000 is permitted (updating propriety).

After the updating propriety determination request is received, in step S1006, the code information determining unit 13 determines whether the updating of the information medium 30 by the communication information 4200 is permitted by making reference to the authority information 4100 included in the code information 4000. For example, when the authority information 4100 included in the code information 4000 is "administrator", the code information determining unit 13 determines that the updating of the information medium 30 by the communication information 4200 is permitted (updating is permitted). On the other hand, when the authority information 4100 is "general", the code information determining unit 13 determines that the updating of the information medium 30 is not permitted (updating is rejected). Then, the code information determining unit 13 sends a notification of the determination result to the control unit 11. In this example, because the authority information 4100 of the code information 4000 is "administrator", the code information determining unit 13 determines that "updating is permitted."

Accordingly, when a log-in user of the image forming apparatus 20 who has displayed a QR CODE® code image is a user whose authority information is "administrator", the updating of the information medium 30 by the communication information 4200 of the code information 4000 included in the QR CODE® code is permitted. On the other hand, when a log-in user of the image forming apparatus 20 who has displayed a QR CODE® code image is not a user whose authority information is "administrator", the updating of the information medium 30 by the communication information 4200 of the code information 4000 included in the QR CODE® code is rejected. Hence, improper updating of the information medium 30 by unauthorized users (whose authority information is not "administrator") can be prevented by rejecting the updating of the information medium 30 by users other than the user whose authority information is "administrator".

When the code information determining unit 13 has determined that "updating is rejected", in step S1007, the control unit 11 transmits, to the UI display unit 16, a screen displaying request for displaying a rejection screen indicating that the updating of the information medium 30 by the communication information 4200 included in the read QR CODE® code is rejected.

After the screen displaying request of the rejection screen is received, in step S1008, the UI display unit 16 of the mobile terminal 10 generates the rejection screen and displays on the display device 102 the rejection screen indicating that the updating of the information medium 30 is rejected. Hence, the user is notified that the communication information of the information medium 30 (NFC chip) cannot be updated by the QR CODE® code read by the mobile terminal 10.

When the code information determining unit 13 has determined that "updating is permitted", in step S1009, the control unit 11 stores the communication information 4200 included in the read QR CODE® code into the information storage unit 18.

In step S1010, the control unit 11 transmits, to the UI display unit 16, a screen displaying request of an updating content confirmation screen which displays the contents of the communication information to be written (updated) to the information medium 30.

Figure 11:
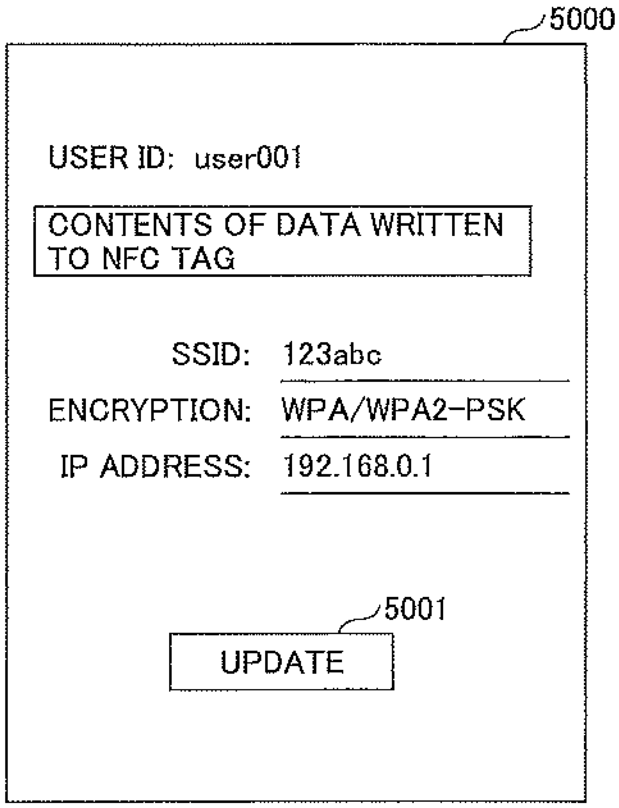
FIG. 11 is a diagram showing an image of an updating content confirmation screen.

After the screen displaying request of the updating content confirmation screen is received, in step S1011, the UI display unit 16 displays an updating content confirmation screen 5000 as shown in FIG. 11 on the display device 102.

FIG. 11 is a diagram showing an image of an updating content confirmation screen 5000. As shown in FIG. 11, the updating content confirmation screen 5000 displayed on the display device 102 includes the contents of the communication information 4200 to be written to the information medium 30. Hence, by the updating content confirmation screen 5000, the user can check the contents of the communication information 4200 to be written to the information medium 30.

In step S1012, the UI display unit 16 transmits an information medium updating request to the information updating unit 14. This information medium updating request is transmitted from the UI display unit 16 to the information updating unit 14 when the user selects an UPDATE button 5001 in the updating content confirmation screen 5000 by using the input device 101. After the information medium updating request is received at the information updating unit 14, the mobile terminal 10 is set in a standby state until a start of the near field communication by the NFC device 110 is detected. In this case, a screen which prompts the user to hold the mobile terminal 10 close to the information medium 30 (NFC chip) of the image forming apparatus 20 may be displayed on the display device 102.

If the user holds the mobile terminal 10 close to the information medium 30, in step S1013, the information updating unit 14 detects a start of near field communication between the mobile terminal 10 and the information medium 30, and then acquires the communication information 4200 from the information storage unit 18.

In step S1014, the information updating unit 14 of the mobile terminal 10 updates the information medium 30 using the communication information 4200 acquired from the information storage unit 18 through the near field communication. Namely, the information updating unit 14 updates the communication information stored in the information medium 30 by the communication information 4200 acquired from the information storage unit 18.

By the above-described update process, only the authorized user is permitted to update the communication information stored in the information medium 30 by using the mobile terminal 10. Hence, for example, when the communication information, such as an IP address of the image forming apparatus 20, is changed, the administrator of the printing system 1 is permitted to update the communication information stored in the information medium 30 attached to the image forming apparatus 20.

Next, a printing process performed by the printing system 1 according to the first embodiment will be described. In this printing process, a user acquires the communication information from the information medium 30 by using the mobile terminal 10, and the mobile terminal 10 transmits a print job to the image forming apparatus 20 based on the acquired communication information, so that the image forming apparatus 20 performs the print job.

Figure 12:
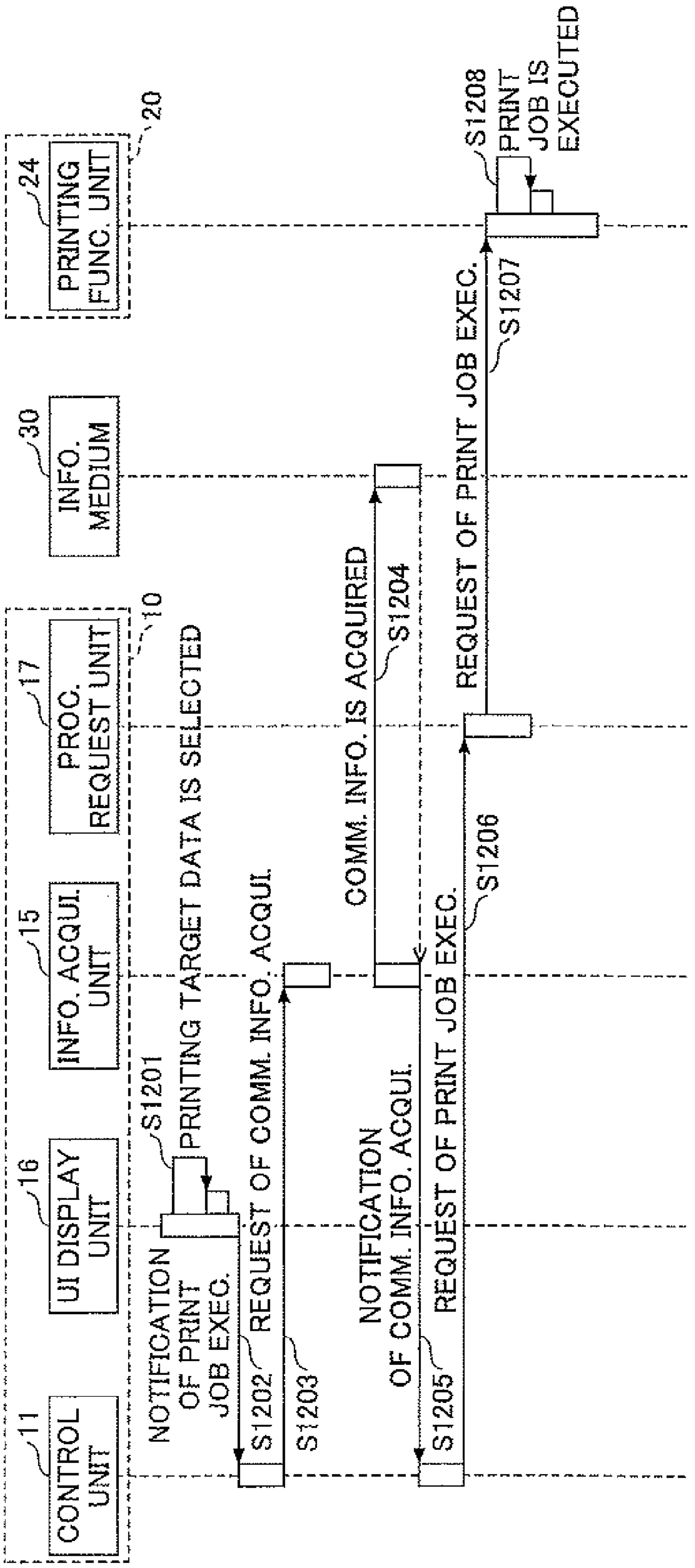
FIG. 12 is a sequence diagram for explaining a printing process performed by the printing system according to the first embodiment.

FIG. 12 is a sequence diagram for explaining a printing process performed by the printing system 1 according to the first embodiment.

As shown in FIG. 12, in step S1201, a user selects a desired printing target data using a printing application installed in the mobile terminal 10 through the UI display unit 16, and sends a printing instruction. Hence, a print job including the printing target data selected by the user is generated.

In step S1202, the UI display unit 16 of the mobile terminal 10 sends a notification of execution of the print job to the control unit 11.

After the notification of execution of the print job is received, in step S1203, the control unit 11 of the mobile terminal 10 sends a communication information acquiring request to the information acquisition unit 15. Then, the mobile terminal 10 is set in a standby state until a start of near field communication by the NFC device 110 is detected. In this case, a screen which prompts the user to hold the mobile terminal 10 close to the information medium 30 (NFC chip) of the image forming apparatus 20 may be displayed on the display device 102.

If the user holds the mobile terminal 10 close to the information medium 30, in step S1204, the information acquisition unit 15 detects a start of the near field communication between the mobile terminal 10 and the information medium 30, and acquires the communication information from the information medium 30.

In step S1205, the information acquisition unit 15 of the mobile terminal 10 sends a notification that the communication information has been acquired from the information medium 30 to the control unit 11.

After the notification that the communication information has been acquired from the information medium 30 is received, in step S1206, the control unit 11 of the mobile terminal 10 transmits a print job execution request to the processing request unit 17.

After the print job execution request is received from the control unit 11, in step S1207, the processing request unit 17 of the mobile terminal 10 transmits a print job to the image forming apparatus 20 the location of which is indicated by the IP address included in the communication information acquired at the step S1204 from the information medium 30.

After the print job is received from the mobile terminal 10, in step S1208, the printing function unit 24 of the image forming apparatus 20 performs the print job to output a copy of the printing target data.

By the above-described printing process, the user on the mobile terminal 10 can request the image forming apparatus 20 to execute the print job so that a copy of the desired printing target data is output.

Second Embodiment

Next, a printing system 1 according to a second embodiment is described. In the printing system 1 according to the second embodiment, a mobile terminal 10A acquires a printing function of an image forming apparatus 20A, and it is determined whether printing target data can be printed by the image forming apparatus 20A. In the following, the elements in the second embodiment which are essentially the same as corresponding elements in the first embodiment are designated by the same reference numerals, and a duplicate description thereof will be omitted. Hence, only the differences of the second embodiment from the first embodiment will be described.

Figure 13:
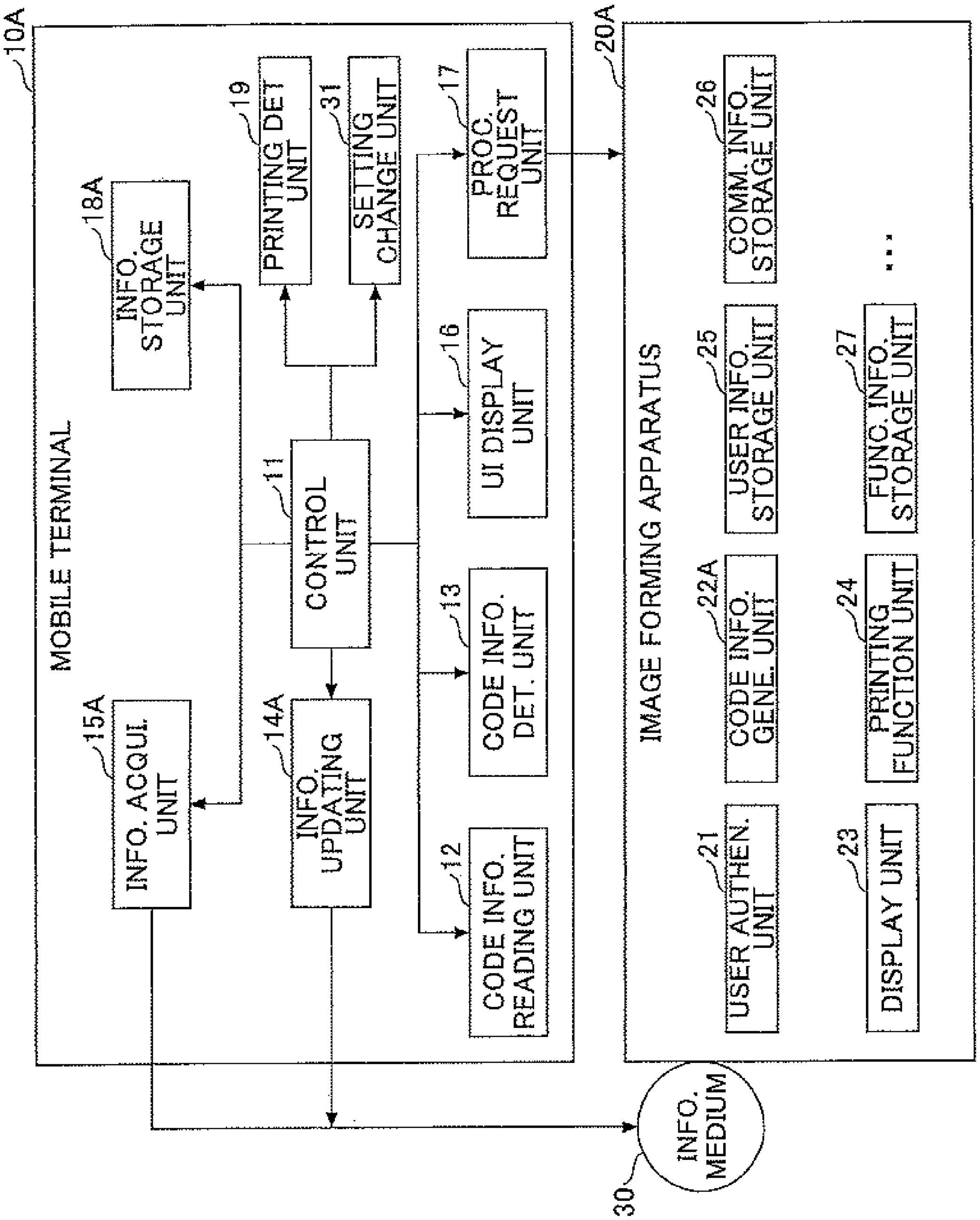
FIG. 13 is a block diagram showing a functional configuration of a printing system according to a second embodiment.

The printing system 1 according to the second embodiment may be implemented by a functional configuration as shown in FIG. 13. FIG. 13 is a block diagram showing a functional configuration of the printing system according to the second embodiment.

As shown in FIG. 13, the mobile terminal 10A of the printing system 1 according to the second embodiment may include an information updating unit 14A, an information acquisition unit 15A, an information storage unit 18A, a printing determining unit 19, and a setting change unit 31, in addition to the units 11-13 and 16-17 which are the same as corresponding units of the first embodiment.

The information updating unit 14A is configured to write the information (communication information and function information) stored in the information storage unit 18A to the information medium 30 to update the information medium 30 with the written information. Here, the function information is information related to a printing function which is executable by the image forming apparatus 20A.

The information acquisition unit 15A is configured to acquire the information (communication information and function information) stored in the information medium 30.

The information storage unit 18A is configured to store the communication information and the function information which are included in the code information acquired by the code information reading unit 12.

The printing determining unit 19 may be implemented by the CPU 106 and is configured to determine whether printing target data can be printed by the image forming apparatus 20A based on function information 6000 stored in a function information storage unit 27 (which will be described later).

The setting change unit 31 may be implemented by the CPU 106 and is configured to change the print setting to a print setting which enables printing of the printing target data according to a user's instruction, when it is determined by the printing determining unit 19 that the printing target data cannot be printed. Here, changing the print setting means changing a value of a setting item included in the print setting.

As shown in FIG. 13, the image forming apparatus 20A of the printing system 1 according to the second embodiment may include a code information generation unit 22A and a function information storage unit 27, in addition to the units 21 and 23-26 which are the same as corresponding units of the first embodiment.

The code information generation unit 22A is configured to generate a predetermined code based on the user information 1000, the communication information 2000, and the function information 6000. In the following, similar to the first embodiment, it is assumed that the predetermined code is a QR CODE® code.

The function information storage unit 27 may be implemented by the HDD 215 and is configured to store the function information 6000 which is the information related to the printing function executable by the image forming apparatus 20A.

Here, the function information 6000 stored in the function information storage unit 27 of the image forming apparatus 20A will be described with reference to FIG. 14. FIG. 14 is a diagram showing an example of the function information 6000. The function information 6000 is information related to the printing function executable by the image forming apparatus 20A and includes various items of PDL, DUPLEX, MONOCHROME, COLOR, STAPLE, etc. The PDL (page description language) item is information indicating a type of PDL with which printing is executable by the image forming apparatus 20A. The DUPLEX item is information indicating whether double-sided printing is executable by the image forming apparatus 20A. The MONOCHROME item is information indicating whether monochrome printing is executable by the image forming apparatus 20A. The COLOR item is information indicating whether color printing is executable by the image forming apparatus 20A. The STAPLE item is information indicating whether printing with a staple option is executable by the image forming apparatus 20A.

For example, the function information 6000 shown in FIG. 14 indicates that the type of PDL with which printing is executable by the image forming apparatus 20A (in which the function information 6000 is stored) is "OOPDL." Similarly, it is indicated that monochrome printing and double-sided printing are executable by the image forming apparatus 20A but color printing and printing with a staple option are not executable.

In this manner, the image forming apparatus 20A according to the second embodiment stores the function information 6000 related to the printing function executable by the image forming apparatus 20A. Hence, the mobile terminal 10A is capable of determining whether the printing of printing target data included in the print job is executable by the image forming apparatus 20A, based on the function information 6000, as will be described later.

Next, processes performed by the printing system 1 according to the second embodiment will be described.

Figure 15:
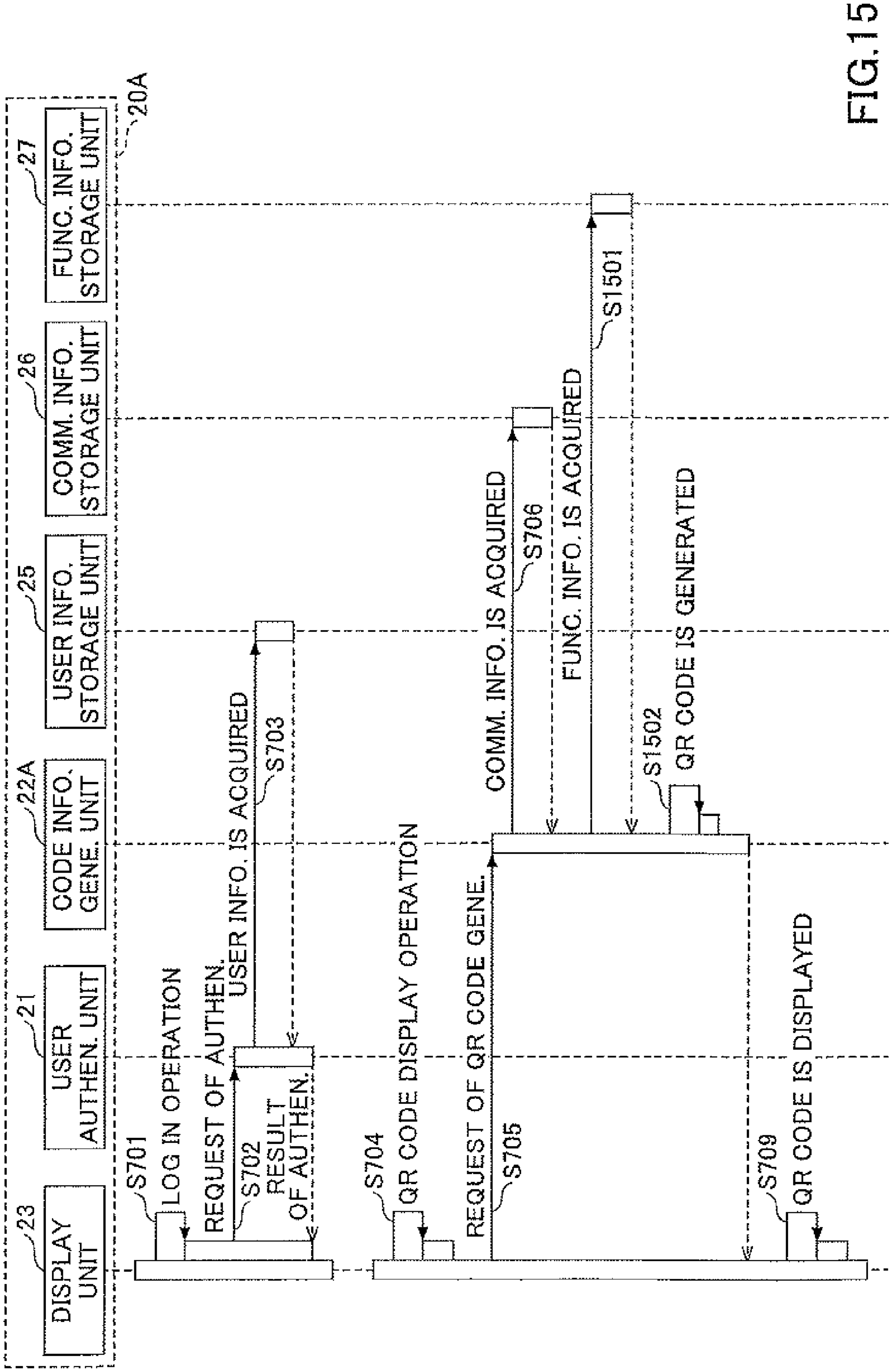
FIG. 15 is a sequence diagram for explaining a QR CODE® code display process performed by the printing system according to the second embodiment.

A QR CODE® code display process which is performed by the printing system 1 to display an image of a QR CODE® code on the operation panel 202 of the image forming apparatus 20A will be described. FIG. 15 is a sequence diagram for explaining the QR CODE® code display process performed by the printing system 1 according to the second embodiment.

n for communicating with the image forming apparatus 20A performs steps S701-S706 which are the same as corresponding steps of the first embodiment shown in FIG. 7 and a description thereof will be omitted.

In step S1501, the code information generation unit 22A of the image forming apparatus 20A acquires the function information 6000 from the function information storage unit 27. In step S1502, the code information generation unit 22A of the image forming apparatus 20A generates a QR CODE® code based on the communication information 2000, the log-in user's authority information included in the user information 1000, and the function information 6000.

Here, the QR CODE® code generated by the code information generation unit 22A may include code information 4000A as shown in FIG. 16.

Here, the QR code generated by the code information generation unit 22A may include code information 4000A as shown in FIG. 16.

FIG. 16 is a diagram showing an example of the code information 4000A according to the second embodiment. As shown in FIG. 16, the code information 4000A includes authority information 4100, communication information 4200, and function information 4300. Here, the authority information 4100 and the communication information 4200 are the same as those described in the first embodiment and a description thereof will be omitted. The function information 4300 is consistent with the function information 6000 acquired from the function information storage unit 27 at the step S1501.

Hence, the QR CODE® code image is displayed on the operation panel 202 of the image forming apparatus 20A according to the second embodiment. Moreover, in the second embodiment, the code information 4000A included in the QR CODE® code further includes the function information 4300 of the image forming apparatus 20A. Thereby, in an information medium update process according to the second embodiment (which will be described later), the function information 4300 as well as the communication information 4200 can be stored into the information medium 30 by the mobile terminal 10A.

Next, an information medium update process performed by the printing system 1 according to the second embodiment will be described. In this information medium update process, the QR CODE® code image displayed on the operation panel 202 of the image forming apparatus 20A is read by the mobile terminal 10A, and the communication information stored in the information medium 30 is updated based on the QR CODE® code.

Figure 17:
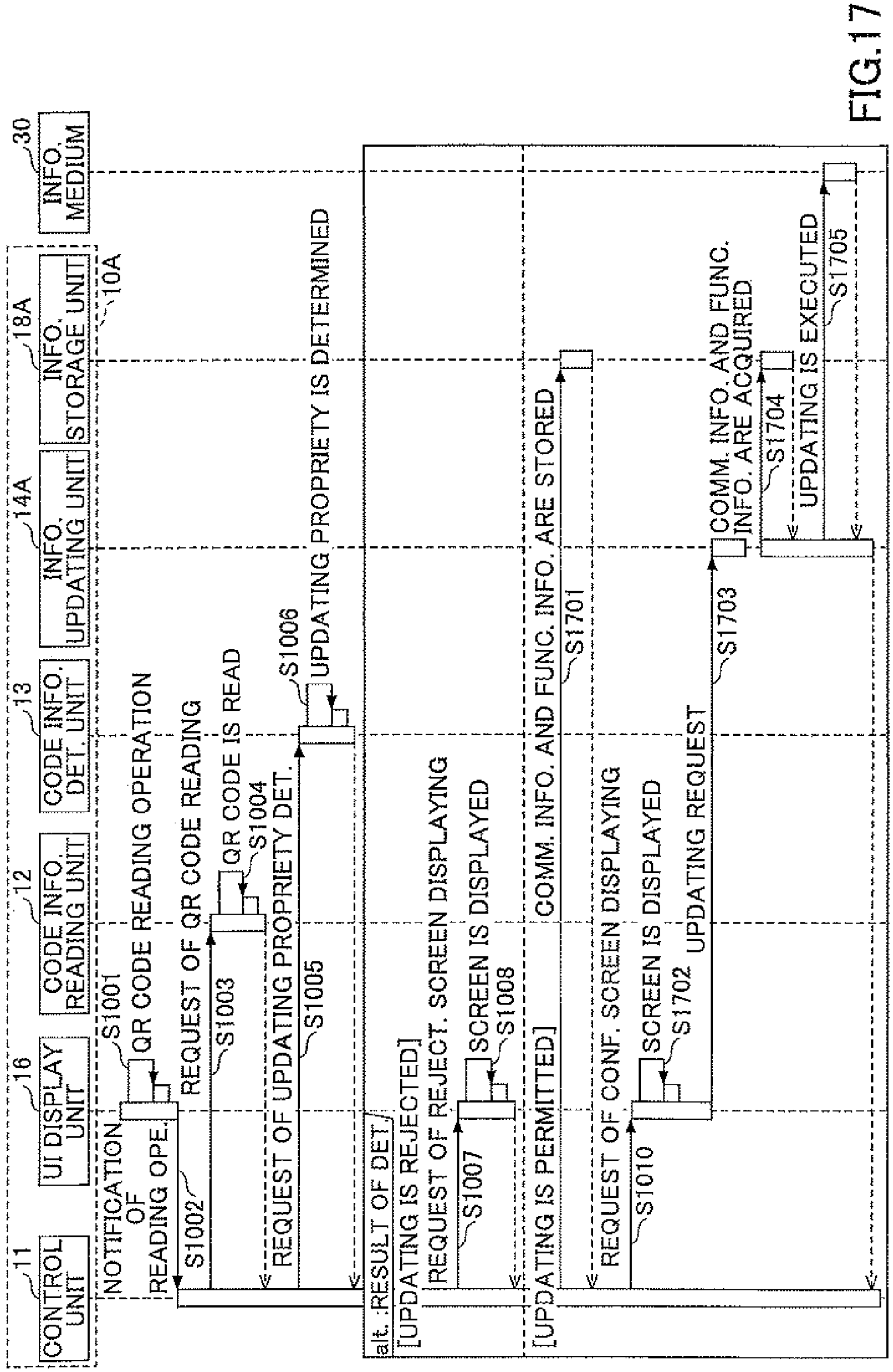
FIG. 17 is a sequence diagram for explaining an information medium update process according to the second embodiment.

FIG. 17 is a sequence diagram for explaining the information medium update process performed by the printing system 1 according to the second embodiment.

As shown in FIG. 17, the mobile terminal 10A performs steps S1001-S1008 and S1010 which are the same as corresponding steps of the first embodiment shown in FIG. 10 and a description thereof will be omitted.

When the code information determining unit 13 has determined that "possible updating is permitted", in step S1701, the control unit 11 stores the communication information 4200 and the function information 4300 (which are included in the code information 4000A of the read QR CODE® code) into the information storage unit 18.

Figure 18:
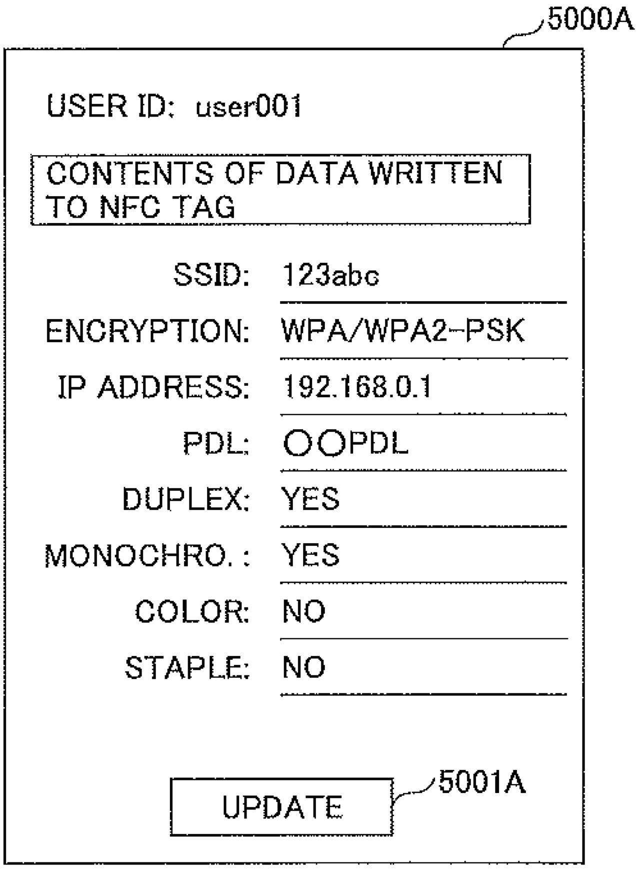
FIG. 18 is a diagram showing an image of an updating content confirmation screen according to the second embodiment.

After the screen displaying request of the updating content confirmation screen is received, in step S1702, the UI display unit 16 of the mobile terminal 10A displays an updating content confirmation screen 5000A as shown in FIG. 18 on the display device 102.

FIG. 18 is a diagram showing an image of the updating content confirmation screen 5000A. As shown in FIG. 18, the updating content confirmation screen 5000A includes the contents of the communication information 4200 and the function information 4300 to be written to the information medium 30. Hence, by the updating content confirmation screen 5000A, the user can check the contents of the information to be written to the information medium 30. In the second embodiment, the contents of the function information 4300 related to the printing functions executable by the image forming apparatus 20A can also be displayed.

In step S1703, the UI display unit 16 of the mobile terminal 10A transmits an information medium updating request to the information updating unit 14A. This information medium updating request is transmitted from the UI display unit 16 to the information updating unit 14A when the user selects an UPDATE button 5001A in the updating content confirmation screen 5000A by using the input device 101. After the information medium updating request is received at the information updating unit 14A, the mobile terminal 10A is set in a standby state until a start of the near field communication by the NFC device 110 is detected.

If the user holds the mobile terminal 10A close to the information medium 30, in step S1704, the information updating unit 14A detects the start of the near field communication between the mobile terminal 10A and the information medium 30, and then acquires the communication information 4200 and the function information 4300 from the information storage unit 18A.

In step S1705, the information updating unit 14A of the mobile terminal 10A updates the information medium 30 using the communication information 4200 and the function information 4300 acquired from the information storage unit 18A through the near field communication. Namely, the information updating unit 14A updates the communication information and the function information stored in the information medium 30 by the communication information 4200 and the function information 4300 acquired from the information storage unit 18A.

By the above-described update process, only the authorized user is permitted to update the communication information and the function information stored in the information medium 30 by using the mobile terminal 10A. Hence, when a new function is added or a functional modification is made to the functions executable by the image forming apparatus 20A, only the administrator of the printing system 1 is permitted to update the function information stored in the information medium 30 attached to the image forming apparatus 20A.

Next, a printing process performed by the printing system 1 according to the second embodiment will be described. In this printing process, a user acquires the communication information and the function information from the information medium 30 by using the mobile terminal 10A, and the mobile terminal 10A transmits a print job to the image forming apparatus 20A based on the acquired communication information and function information, so that the image forming apparatus 20A performs the print job.

Figure 19:
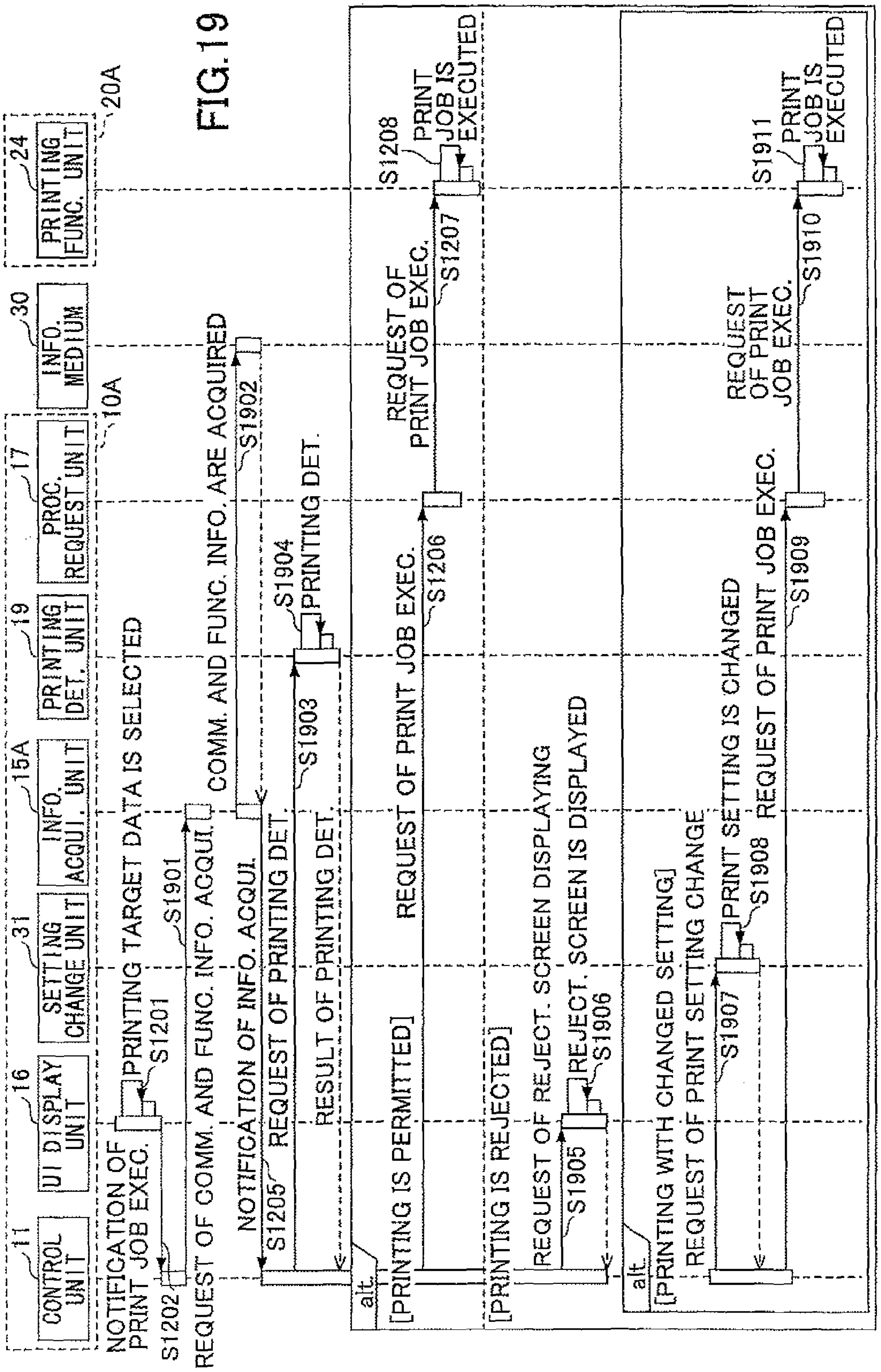
FIG. 19 is a sequence diagram for explaining a printing process performed by the printing system according to the second embodiment.

FIG. 19 is a sequence diagram for explaining a printing process performed by the printing system according to the second embodiment.

As shown in FIG. 19, the mobile terminal 10A performs steps S1201-S1202 and S1205-S1207 which are the same as corresponding steps of the first embodiment shown in FIG. 12 and a description thereof will be omitted.

After the notification of execution of the print job is received, in step S1901, the control unit 11 of the mobile terminal 10A sends an information acquisition request of communication information and function information to the information acquisition unit 15A. Then, the mobile terminal 10A is set in a standby state until a start of near field communication by the NFC device 110 is detected.

If the user holds the mobile terminal 10A close to the information medium 30, in step S1902, the information acquisition unit 15A detects a start of the near field communication between the mobile terminal 10A and the information medium 30, and acquires the communication information and the function information from the information medium 30.

After the notification of acquisition of the communication information and the function information from the information medium 30 is received, in step S1903, the control unit 11 sends a printing propriety determining request to the printing determining unit 19. Upon reception of this request, the printing determining unit 19 determines whether printing of the printing target data is executable by the image forming apparatus 20A.

In step S1904, the printing determining unit 19 determines whether printing of the printing target data is executable by the image forming apparatus 20A based on the function information acquired at step S1902. Then, the printing determining unit 19 transmits the result of the determination to the control unit 11.

Specifically, when the function information 4300 has been acquired at step S1902, the printing determining unit 19 performs the printing propriety determination regarding the following points (1) and (2).

(1) Whether the PDL used by the printing application to which the printing instruction is given (or whether the PDL used by the printer driver to which the printing target data is sent by the printing application) is defined in the function information 4300.

For example, when the PDL used by the printing application to which the printing instruction is given is "OOPDL", the PDL is defined in the function information 4300, and it is determined that the printing is executable (the printing is permitted). On the other hand, when the PDL used by the printing application to which the printing instruction is given is not "OOPDL", the PDL is not defined in the function information 4300, and it is determined that the printing is not executable (the printing is rejected).

(2) Whether the print setting included in the print job is defined in the function information 4300 as being executable.

For example, when the value of the setting item "color/monochrome" of the print setting included in the print job is set to "color", color printing is not defined in the function information 4300 as being executable, and it is determined that the printing is not executable (the printing is rejected). On the other hand, when the value of the setting item "color/monochrome" of the print setting included in the print job is set to "monochrome", monochrome printing is defined in the function information 4300 as being executable, and it is determined that the printing is executable (the printing is permitted).

In addition, when a setting item of a print setting included in a print job is not defined in the function information 4300, it is determined that the printing is not executable. For example, when the setting item of the print setting included in the print job is "punch", and the "punch" is not defined in the function information 4300, it is determined that the printing is not executable (the printing is rejected).

When the result of the determination by the printing determining unit 19 at step S1904 is "printing is permitted", the mobile terminal 10A performs steps S1206 and S1207 which are the same as corresponding steps of the first embodiment shown in FIG. 12.

On the other hand, when the result of the determination by the printing determining unit 19 at step S1904 is "printing is rejected", the mobile terminal 10A performs step S1905.

In step S1905, the control unit 11 transmits to the UI display unit 16 a screen displaying request for displaying a printing rejection screen indicating that the printing is not executable by the image forming apparatus 20A.

Figure 20:
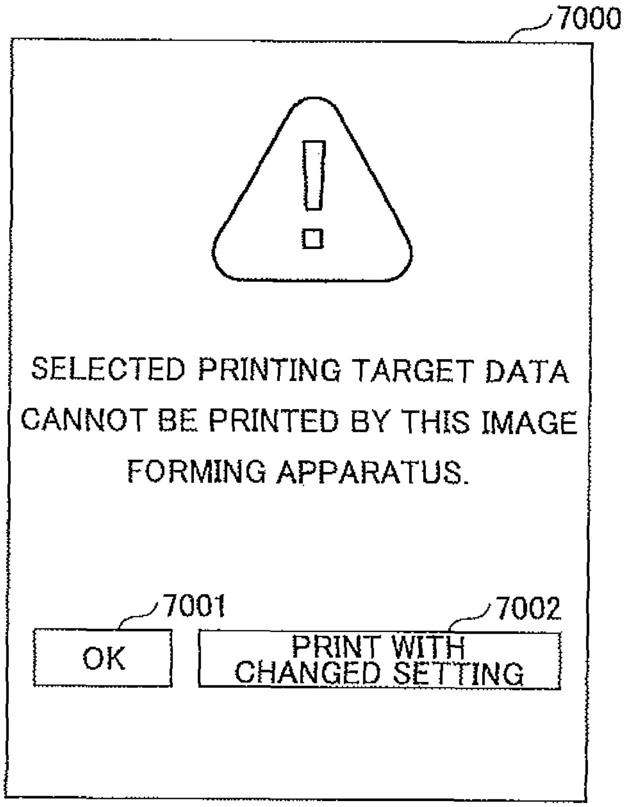
FIG. 20 is a diagram showing an image of a printing rejection screen according to the second embodiment.

After the screen displaying request of the printing rejection screen is received, in step S1906, the UI display unit 16 displays a printing rejection screen 7000 as shown in FIG. 20 on the display device 102. FIG. 20 is a diagram showing an image of the printing rejection screen 7000 according to the second embodiment.

As shown in FIG. 20, the printing rejection screen 7000 is a screen indicating that printing of the printing target data selected by the user at step S1201 is not executable by the image forming apparatus 20A. If an OK button 7001 in the printing rejection screen 7000 shown in FIG. 20 is pressed by the user, the printing process is terminated by the mobile terminal 10A. In this case, printing of the printing target data is not performed.

Here, depending on the result of the determination by the printing determining unit 19 at step S1902, there is a case in which the printing of the printing target data is executable by the image forming apparatus 20A if the print setting is changed.

For example, suppose a case in which the value of the setting item "color/monochrome" of the print setting included in the print job is set to "color", color printing is not defined in the function information 4300 as being executable, and monochrome printing is defined in the function information 4300 as being executable. In this case, if the value "color" of the setting item "color/monochrome" of the print setting included in the print job is changed to "monochrome", monochrome printing is executable by the image forming apparatus 20A.

In the above case, in the printing system 1 according to the second embodiment, if a "PRINT WITH CHANGED SETTING" button 7002 in the printing rejection screen 7000 is pressed by the user, printing of the printing target data is executed by the image forming apparatus 20A after the print setting included in the print job is changed by the mobile terminal 10A.

The mobile terminal 10A performs steps S1907-S1911, as shown in FIG. 19, when the "PRINT WITH CHANGED SETTING" button 7002 in the printing rejection screen 7000 is pressed by the user.

When the printing of the printing target data is still not executable by the image forming apparatus 20A even if the print setting included in the print job is changed, the "PRINT WITH CHANGED SETTING" button 7002 in the printing rejection screen 7000 may be deactivated. For example, in a case where the PDL used by the printing application cannot be changed to the PDL defined in the function information 4300, the printing of the printing target data is still not executable by the image forming apparatus 20A. For example, in such a case, a printer driver which is capable of transforming the printing target data into date of the PDL defined in the function information 4300 is not installed in the mobile terminal 10A.

In step S1907, the control unit 11 transmits a setting change request of the print setting included in the print job to the setting change unit 31.

In step S1908, the setting change unit 31 changes the print setting included in the print job based on the function information acquired at the step S1902. Then, the setting change unit 31 transmits a notification that the print setting has been changed to the control unit 11.

For example, when the value of the setting item "color/monochrome" of the print setting included in the print job is set to "color" and color printing is not defined in the function information 4300 as being executable, the setting change unit 31 changes the value of the setting item "color/monochrome" of the print setting to "monochrome".

In step S1909, the control unit 11 transmits a print job execution request including the changed print setting to the processing request unit 17.

After the print job execution request is received from the control unit 11, in step S1910, the processing request unit 17 transmits a print job to the image forming apparatus 20A indicated by the IP address included in the communication information based on the communication information acquired from the information medium 30 at the step S1902. The print job transmitted at step S1910 includes the changed print setting.

After the print job is received from the mobile terminal 10A, in step S1911, the printing function unit 24 of the image forming apparatus 20A executes the print job and outputs a copy of the printing target data. At this time, the printing function unit 24 outputs the copy of the printing target data according to the values of the setting items of the changed print setting included in the print job.

By the above-described printing process, the user can perform printing of the selected printing target data on the image forming apparatus 20A. According to the second embodiment, the mobile terminal 10A determines whether the printing of the printing target data is executable by the image forming apparatus 20A, and changes the print setting according to the result of the determination, so that the image forming apparatus 20A executes the print job.

In the second embodiment, the mobile terminal 10A acquires the function information and the communication information from the information medium 30 in the step S1902. However, the present invention is not limited to this example. The mobile terminal 10A may cause the imaging device 109 to capture a QR CODE® code image displayed on the operation panel 202 of the image forming apparatus 20A, and may cause the code information reading unit 12 to acquire the function information and the communication information based on the QR CODE® code.

In this case, the mobile terminal 10A may be configured so that, if the user performs a predetermined operation on the imaging device 109, changing of the print setting included in the print job or cancellation of the print job is performed.

For example, the mobile terminal 10A may be configured so that, if the user performs an operation to close the lens of the imaging device 109 continuously over a predetermined period of time after the QR CODE® code is read by the imaging device 109 of the mobile terminal 10A and the function information and the communication information are acquired, cancellation of the print job is performed. The predetermined period of time may be one second or several seconds.

Moreover, the mobile terminal 10A may be configured so that, if the user performs an operation to close a predetermined range (e.g., an upper half portion) of the lens of the imaging device 109 after the QR CODE® code is read by the imaging device 109 and the function information and the communication information are acquired, the value of the setting item “color/monochrome” of the print setting is set to “monochrome”.

Moreover, the mobile terminal 10A may be configured so that, if the user performs an operation to close a predetermined range (e.g., a lower half portion) of the lens of the imaging device 109 after the QR CODE® code is read by the imaging device 109 and the function information and the communication information are acquired, the number of copies printed by the image forming apparatus 20A is incremented by one.

When a print job is transmitted from the mobile terminal 10A to the image forming apparatus 20A by reading a QR CODE® code using the imaging device 109 of the mobile terminal 10A, several operations, such as changing the print setting or cancellation of the print job, may be performed on the mobile terminal 10A according to a light beam detected by the imaging device 109.

As described in the foregoing, in the printing system 1 according to the first embodiment, when a user attempts to write information to the information medium 30, such as an NFC chip, attached to the image forming apparatus 20, using the mobile terminal 10, the mobile terminal 10 acquires the information to be written to the information medium 30 from the predetermined code, such as a QR CODE® code, displayed on the operation panel 202 of the image forming apparatus 20. At this time, the information acquired from the predetermined code always includes the log-in user's authority information used when generating and displaying the predetermined code on the image forming apparatus 20, and the mobile terminal 10 determines whether writing the acquired information to the information medium 30 is permitted based on the authority information included in the acquired information. Therefore, the updating (writing) of the information medium 30 with undesired information with no proper authority information can be prevented safely.

Moreover, in the printing system 1 according to the second embodiment, the authorized user using the mobile terminal 10 can write function information related to a printing function executable by the image forming apparatus 20A to the information medium 30. Hence, the information acquired from the predetermined code always includes the function information, and the mobile terminal 10A generates a print job including the acquired information and determines whether the print job is executable by the image forming apparatus 20A based on the function information included in the acquired information, and the print setting included in the print job can be changed according to the result of the determination.

In the foregoing embodiments, the code information reading unit 12 may be an example of a first acquisition unit in the claims, the information acquisition unit 15 may be an example of a second acquisition unit in the claims, the code information determining unit 13 may be an example of a determination unit in the claims, the information updating unit 14 may be an example of an updating unit in the claims, and the code information generation unit 22 may be an example of a code generation unit in the claims.

As described above, the information processing program product, the information processing apparatus, and the information processing system according to the invention can safely prevent the information medium from being updated with undesired information including no proper authority information.

The information processing program product, the information processing apparatus, and the information processing system according to the invention are not limited to the above-described embodiments; and changes and modifications may be made without departing from the scope of the present invention.

The present application is based upon and claims the benefit of priority of Japanese Patent Application No. 2014-127096, filed on Jun. 20, 2014, and Japanese Patent Application No. 2015-097118, filed on May 12, 2015, the contents of which are incorporated herein by reference in their entirety.

The invention claimed is:

1. An information processing program product comprising a non-transitory computer-readable medium having a program recorded thereon that is executable by a processor of an information processing apparatus connected to one or more apparatuses via a network, the program when executed causing the processor to:

acquire (a) communication information for communicating with a target apparatus among the one or more apparatuses and (b) authority information for writing the communication information to a predetermined information medium, the authority information being associated with a specified user of the information processing apparatus;

determine whether the writing of the communication information to the information medium by the information processing apparatus is permitted based on the acquired authority information; and write the communication information to the information medium when it is determined that the writing of the communication information by the information processing apparatus to the information medium is permitted, to update the information medium with the written communication information, the written communication information enabling the specified user to transmit, from the information processing apparatus to the target apparatus, a job to be executed by the target apparatus.

2. The information processing program product according to claim 1, wherein the program when executed further causes the processor to acquire the communication information from the information medium, and send a predetermined processing request to an apparatus indicated by the communication information acquired from the information medium, based on the acquired communication information.

3. The information processing program product according to claim 1, wherein the communication information and the authority information are acquired when reading a predetermined code through an imaging device of the information processing apparatus.

4. The information processing program product according to claim 3, wherein the program when executed further causes the processor to acquire function information indicating a function executable by the target apparatus, and write the communication information and the function information to the information medium.

5. The information processing program product according to claim 3, wherein the predetermined code is displayed on a display device of the target apparatus, and the authority information is authority information which is given to a log-in user of the target apparatus having performed a code displaying operation related to the predetermined code.

6. The information processing program product according to claim 1, wherein the information medium is an NFC chip and, when it is determined that the writing of the communication information to the information medium is permitted, the communication information is written to the information medium through near field communication to update the information medium with the written communication information.

7. The information processing program product according to claim 1, wherein when it is determined that the writing of the communication information to the information medium is not permitted, the information medium is not updated with the written communication information, and the information processing apparatus nonetheless may be permitted to read the communication information of the information medium, based on the authority information.

8. An information processing apparatus connected to one or more apparatuses via a network, the information processing apparatus including a processor and a non-transitory computer readable medium storing one or more programs causing the processor to:

acquire communication information for communicating with an apparatus among the one or more apparatuses and authority information for writing the communication information to a predetermined information medium, the authority information being associated with a specified user of the information processing apparatus;

determine whether the writing of the communication information to the information medium by the information processing apparatus is permitted based on the acquired authority information; and write the communication information to the information medium when it is determined that the writing of the communication information by the information processing apparatus to the information medium is permitted, to update the information medium with the written communication information, the written communication information enabling the specified user to transmit, from the information processing apparatus to the target apparatus, a job to be executed by the target apparatus.

9. The information processing apparatus according to claim 8, wherein the program when executed further causes the processor to acquire the communication information from the information medium, and send a predetermined processing request to an apparatus indicated by the communication information acquired from the information medium, based on the acquired communication information.

10. The information processing apparatus according to claim 8, wherein the communication information and the authority information are acquired when reading a predetermined code through an imaging device of the information processing apparatus.

11. The information processing apparatus according to claim 8, wherein the predetermined code is displayed on a display device of the target apparatus, and the authority information is authority information which is given to a log-in user of the target apparatus having performed a code displaying operation related to the predetermined code.

12. The information processing apparatus according to claim 8, wherein the information medium is an NFC chip and, when it is determined that the writing of the communication information to the information medium is permitted, the communication information is written to the information medium through near field communication to update the information medium with the written communication information.

13. An information processing system including one or more apparatuses and an information processing apparatus connected to the one or more apparatuses via a network, the information processing apparatus including a processor and a non-transitory computer readable medium storing one or more programs causing the processor to:

acquire communication information for communicating with an apparatus among the one or more apparatuses and authority information for writing the communication information to a predetermined information medium, the authority information being associated with a specified user of the information processing apparatus;

determine whether the writing of the communication information to the information medium by the information processing apparatus is permitted based on the acquired authority information acquired; and write the communication information to the information medium when it is determined that the writing of the communication information by the information processing apparatus to the information medium is permitted, to update the information medium with the written communication information, the written communication information enabling the specified user to transmit, from the information processing apparatus to the target apparatus, a job to be executed by the target apparatus.

14. The information processing system according to claim 13, wherein the program when executed further causes the processor to generate a predetermined code including the communication information and the authority information, wherein the communication information and the authority information are acquired when reading the predetermined code through an imaging device of the information processing apparatus.

* * * * *